(12) United States Patent
Shimizu

(10) Patent No.: US 8,382,359 B2
(45) Date of Patent: Feb. 26, 2013

(54) LIGHTING DEVICE, DISPLAY DEVICE AND TELEVISION RECEIVER

(75) Inventor: Takaharu Shimizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 115 days.

(21) Appl. No.: 13/063,789

(22) PCT Filed: Jul. 2, 2009

(86) PCT No.: PCT/JP2009/062108
§ 371 (c)(1),
(2), (4) Date: Mar. 14, 2011

(87) PCT Pub. No.: WO2010/041498
PCT Pub. Date: Apr. 15, 2010

(65) Prior Publication Data
US 2011/0170019 A1 Jul. 14, 2011

(30) Foreign Application Priority Data
Oct. 10, 2008 (JP) .................... 2008-264260

(51) Int. Cl.
*F21V 7/04* (2006.01)
*H01R 33/00* (2006.01)

(52) U.S. Cl. ........ 362/612; 362/613; 362/623; 362/624; 362/628; 362/609

(58) Field of Classification Search ............... 362/623, 362/624, 625, 609, 616, 628, 612, 613
See application file for complete search history.

(56) References Cited

U.S. PATENT DOCUMENTS

| 5,126,836 A | 6/1992 | Um |
| 5,150,205 A | 9/1992 | Um et al. |

(Continued)

FOREIGN PATENT DOCUMENTS

| JP | 2001-312916 A | 11/2001 |
| JP | 2006-108045 A | 4/2006 |

(Continued)

OTHER PUBLICATIONS

Kasai, "Illumination Device, Surface Illuminant Device, Display Device, and Television Receiver", U.S. Appl. No. 13/124,188, filed Apr. 14, 2011.
Official Communication issued in International Patent Application No. PCT/JP2009/062108, mailed on Oct. 6, 2009.
Official Communication issued in corresponding Russian Patent Application No. 2011113329, mailed on Jun. 26, 2012.

*Primary Examiner* — Robert May
(74) *Attorney, Agent, or Firm* — Keating & Bennett, LLP

(57) ABSTRACT

A backlight unit 12 includes LEDs 15, light guide plates 18, reflection sheets 24, LED boards 17 and reflection parts 47. Each light guide plate 18 has a light entrance surface 34 and a light exit surface 36. The light entrance surface 34 is arranged so as to face the corresponding LED 16 via a gap C. Light from the LED 16 enters the light entrance surface. The light exit surface 36 is arranged parallel to an arrangement direction in which the LED 16 and the light entrance surface 34 are arranged. The light exits from the light exit surface. Each reflection sheet 24 is arranged on an opposite surface of the corresponding light guide plate 18 from the light exit surface and configured to reflect light toward the light exit surface 36. Each LED board 17 is arranged so as to face the corresponding reflection sheet 24. The LEDs 16 and the light guide plates 18 are mounted to the respective LED boards 17. Each reflection part 47 is arranged on the corresponding LED board 17 at least in an area between the LED 16 and the light entrance surface 34 and configured to reflect light toward the light entrance surface 34.

20 Claims, 20 Drawing Sheets

U.S. PATENT DOCUMENTS

| | | | |
|---|---|---|---|
| 5,185,660 | A | 2/1993 | Um |
| 5,245,369 | A | 9/1993 | Um et al. |
| 5,260,798 | A | 11/1993 | Um et al. |
| 5,616,982 | A | 4/1997 | Um et al. |
| 6,241,358 | B1 | 6/2001 | Higuchi et al. |
| 6,290,364 | B1 | 9/2001 | Koike et al. |
| 6,464,367 | B2 | 10/2002 | Ito et al. |
| 7,548,287 | B2 * | 6/2009 | Oh .................................. 349/65 |
| 7,857,476 | B2 * | 12/2010 | Pakhchyan et al. .......... 362/97.3 |
| 7,903,198 | B2 * | 3/2011 | Abe et al. ......................... 349/65 |
| 2001/0017774 | A1 | 8/2001 | Ito et al. |
| 2005/0168967 | A1 * | 8/2005 | Kao et al. ......................... 362/27 |
| 2006/0245213 | A1 * | 11/2006 | Beil et al. ....................... 362/616 |
| 2007/0058392 | A1 * | 3/2007 | Watanabe et al. .............. 362/612 |
| 2007/0247869 | A1 * | 10/2007 | Lang et al. ..................... 362/612 |
| 2008/0137364 | A1 * | 6/2008 | Liu ................................. 362/606 |
| 2008/0225203 | A1 * | 9/2008 | Kim ................................. 349/65 |
| 2009/0086507 | A1 * | 4/2009 | Iwasaki ........................... 362/613 |
| 2009/0097277 | A1 * | 4/2009 | Iwasaki ........................... 362/628 |

FOREIGN PATENT DOCUMENTS

| | | |
|---|---|---|
| RU | 2 112 323 C1 | 5/1998 |
| RU | 2 258 949 C1 | 8/2005 |
| WO | WO 2006129625 A1 * | 12/2006 |

* cited by examiner

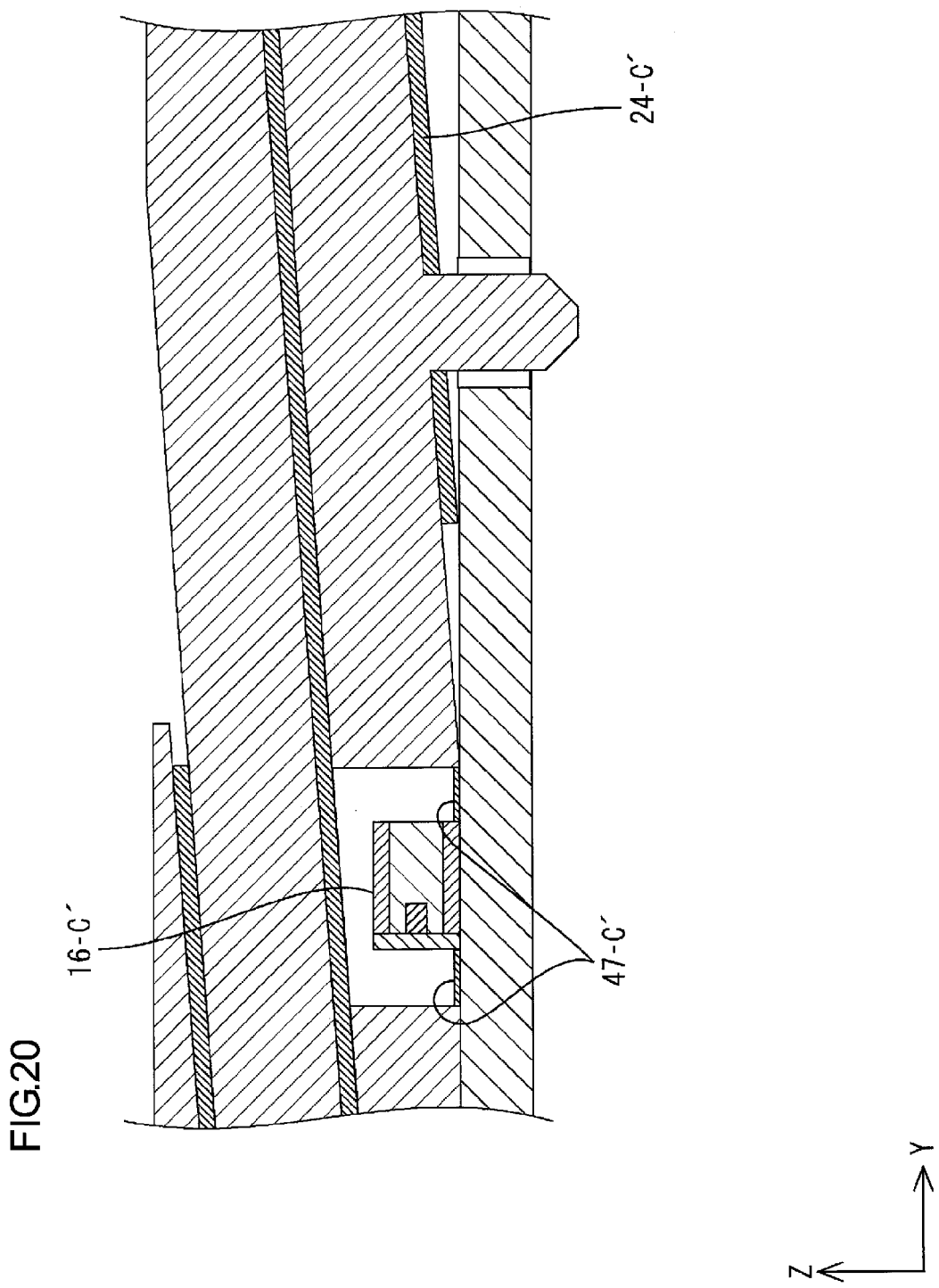

LIGHTING DEVICE, DISPLAY DEVICE AND TELEVISION RECEIVER

TECHNICAL FIELD

The present invention relates to a lighting device, a display device and a television receiver.

BACKGROUND ART

In recent years, displays of image display devices including television receivers are shifting from conventional cathode-ray tube displays to thin-screen displays including liquid crystal panels and plasma display panels. With the thin-screen displays, thin image display devices can be provided. A liquid crystal display device requires a backlight unit as a separate lighting device because a liquid crystal panel used therein is not a light-emitting component.

A technology to provide thin liquid crystal display devices is disclosed in Patent Document 1. A backlight unit disclosed therein includes LEDs and light guide plates. Each LED has a light-emitting surface through which light is emitted in the direction substantially parallel to a display surface of a liquid crystal panel. Each light guide plate has a light entrance surface in a side area (a side-edge area) and a light exit surface on a top surface. A lower surface of each light guide plate, that is, a surface opposite from the light exit surface has scattering patterns for scattering light and a reflection sheet for reflecting light. With such patterns and reflection sheet, uniform in-plane brightness distribution is achieved on the light exit surface.

Patent Document 1: Japanese Published Patent Application No. 2006-108045

Problem to be Solved by the Invention

In the lighting device having the above configuration, gaps in predetermined sizes may be required between the adjacent light guide members for the following reason. During mounting of a plurality of the light guide members, assembly errors occur. If no gaps are provided, the light entrance surfaces of the light guide members may interfere with the LEDs when the light guide members are mounted. As a result, the LEDs may be damaged. Furthermore, the gaps may be required to compensate for interference between the light guide members and the LEDs due to thermal expansion that may occur while the light-emitting components are lit.

When the gaps are provided between the light exit surfaces of the LEDs and the light entrance surfaces of the light guide plates, some rays of light emitted from the LEDs directly strike the LED boards. Those rays may be absorbed by the LED boards. Namely, they do not reach the light entrance surfaces. As a result, efficiency in using light from LEDs decreases and thus brightness of the light guide plates and the backlight decreases.

DISCLOSURE OF THE PRESENT INVENTION

The present invention was made in view of the foregoing circumstances. An object of the present invention is to achieve high brightness.

Problem to be Solved by the Invention

To solve the above problem, a lighting device of the present invention includes at least one light source, at least one light exit surface, at least one reflection member, at least one base member and at least one reflection part. The light guide member has a light entrance surface and a light exit surface. The light entrance surface is arranged so as to face the light source via a gap. The light exit surface is arranged along an arrangement direction in which the light source and the light entrance surface are arranged. Light from the light source enters the light entrance surface and exits from the light exit surface. The reflection member is arranged on an opposite surface of the light guide member from the light exit surface and configured to reflect light toward the light exit surface. The base member is arranged so as to face the reflection member and to which the light source and the light guide member are mounted. The reflection part is provided at least in an area of the base member between the light source and the light entrance surface and configured to reflect light toward the light entrance surface.

The light emitted from the light source includes rays that directly enter the light entrance surface and rays that travel toward the base member. The rays that travel toward the base member are reflected by the reflection part arranged on the base member between the light source and the light entrance surface so as to travel toward the light entrance surface. As a result, the rays enter the light entrance surface. With this configuration, the light is less likely to be absorbed by the base member in comparison to the known devices. Therefore, efficiency in using light emitted from the light source improves.

The gap is provided between the light source and the light entrance surface. The gap allows the thermal expansion and compensates for an error that may occur when the light guide member is mounted to the base member. Therefore, the light guide member is less likely to interfere with the light source.

BRIEF DESCRIPTION OF THE DRAWINGS

FIG. 20 is a magnified cross-sectional view of a light guide plate around an LED holding space according to another embodiment (1) of the present invention.

BEST MODE FOR CARRYING OUT THE INVENTION

First Embodiment

The first embodiment of the present invention will be explained with reference to FIGS. 1 to 14. In this embodiment, a liquid crystal display device 10 will be explained. X-axes, Y-axes and Z-axes in some figures correspond to each other so as to indicate the respective directions. In FIGS. 4 to 11, the upper side and the lower side correspond to the front-surface side and the rear-surface side, respectively.

Figure 1:
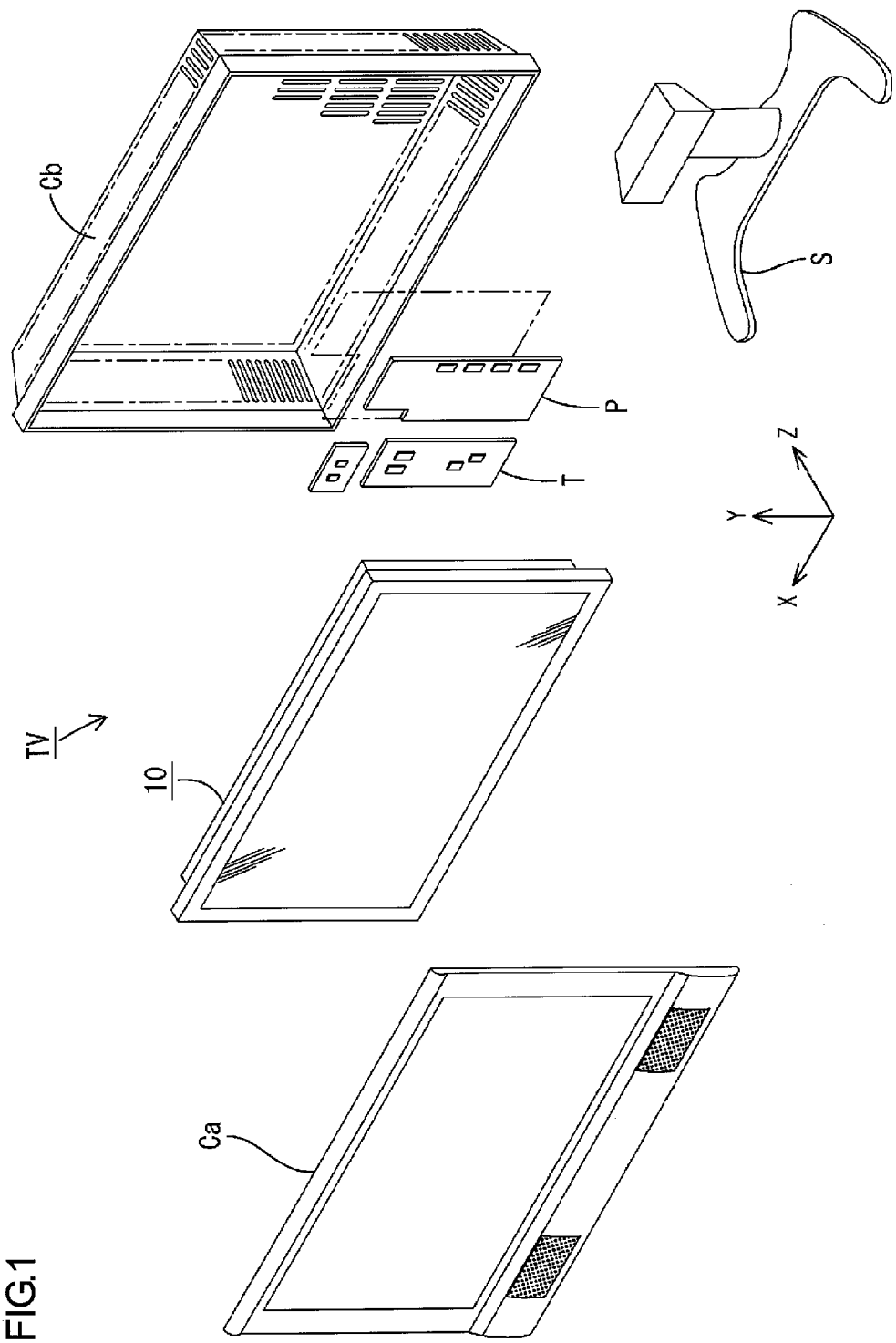
FIG. 1 is an exploded perspective view illustrating a general construction of a television receiver according to the first embodiment.
Figure 2:
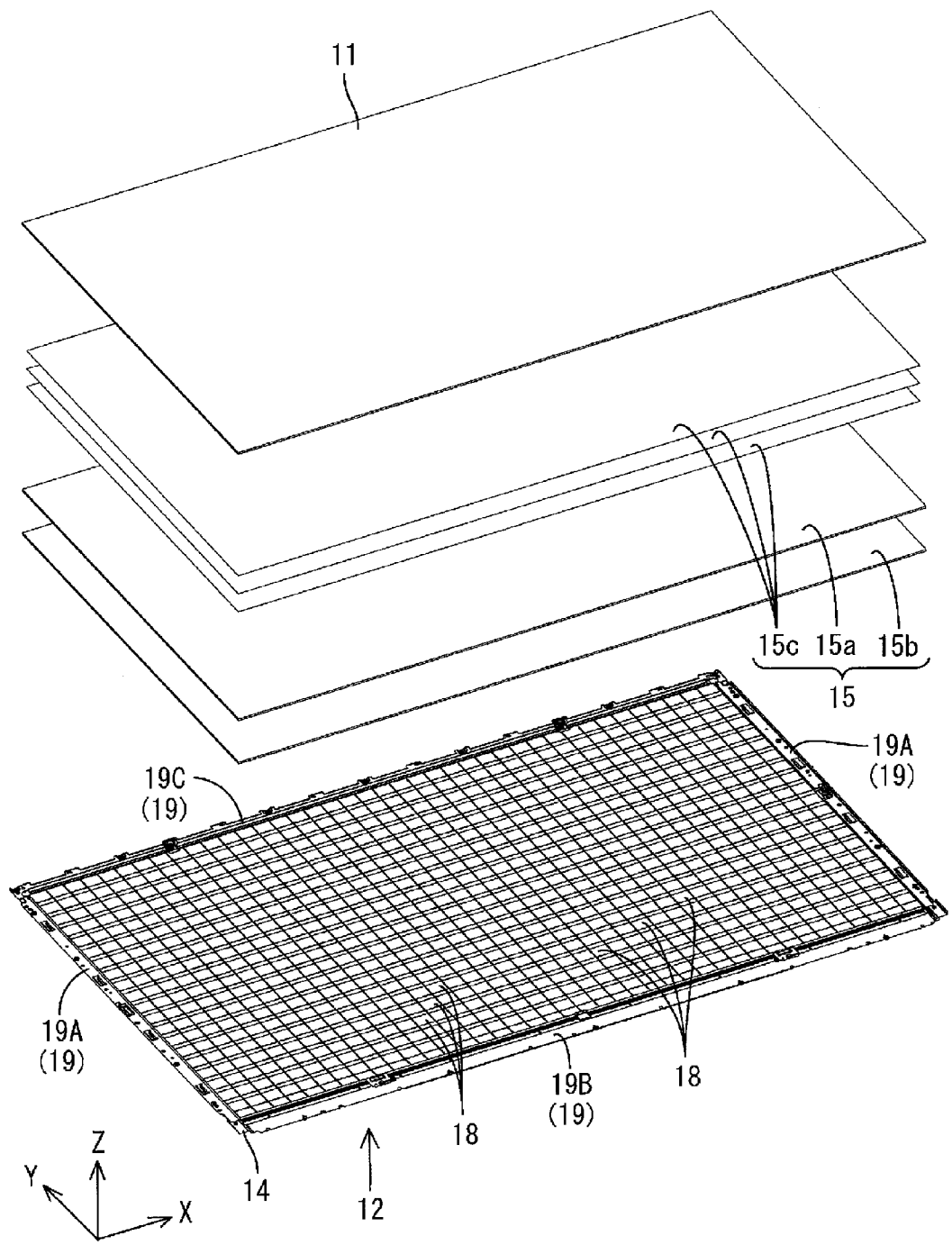
FIG. 2 is an exploded perspective view illustrating a general construction of a liquid crystal panel and a backlight unit.

As illustrated in FIG. 1, the television receiver TV of this embodiment includes the liquid crystal display device 10 (a display device), cabinets Ca and Cb, a power source P, and a tuner T. The cabinets Ca and Cb sandwich the liquid crystal display device 10 therebetween. The liquid crystal display device 10 is housed in the cabinets Ca and Cb. The liquid crystal display device 10 is held by a stand S in a vertical position in which a display surface 11a is set along a substantially vertical direction (the Y-axis direction). The liquid crystal display device 10 has a landscape rectangular overall shape. As illustrated in FIG. 2, the liquid crystal display device 10 includes a liquid crystal panel 11, which is a display panel, and a backlight unit 12 (a lighting device), which is an external light source. The liquid crystal panel 11 and the backlight unit 12 are held together by a frame-shaped bezel 13.

"The display surface 11a is set along the vertical direction" is not limited to a condition that the display surface 11a is set parallel to the vertical direction. The display surface 11a may be set along a direction closer to the vertical direction than the horizontal direction. For example, the display surface 11a may be 0° to 45° slanted to the vertical direction, preferably 0° to 30° slanted.

Next, the liquid crystal panel 11 and the backlight unit 12 included in the liquid crystal display device 10 will be explained. The liquid crystal panel (a display panel) 11 has a rectangular plan view and includes a pair of transparent glass substrates bonded together with a predetermined gap therebetween and liquid crystals sealed between the substrates. On one of the glass substrates, switching components (e.g., TFTs), pixel electrodes and an alignment film are arranged. The switching components are connected to gate lines and the source lines that are perpendicular to each other. The pixel electrodes are connected to the switching components. On the other glass substrate, color filters including R (red) G (green) B (blue) color sections in predetermined arrangement, a counter electrode and an alignment film are arranged. Polarizing plates are arranged on outer surfaces of the glass substrates, respectively (see FIG. 5).

Figure 4:
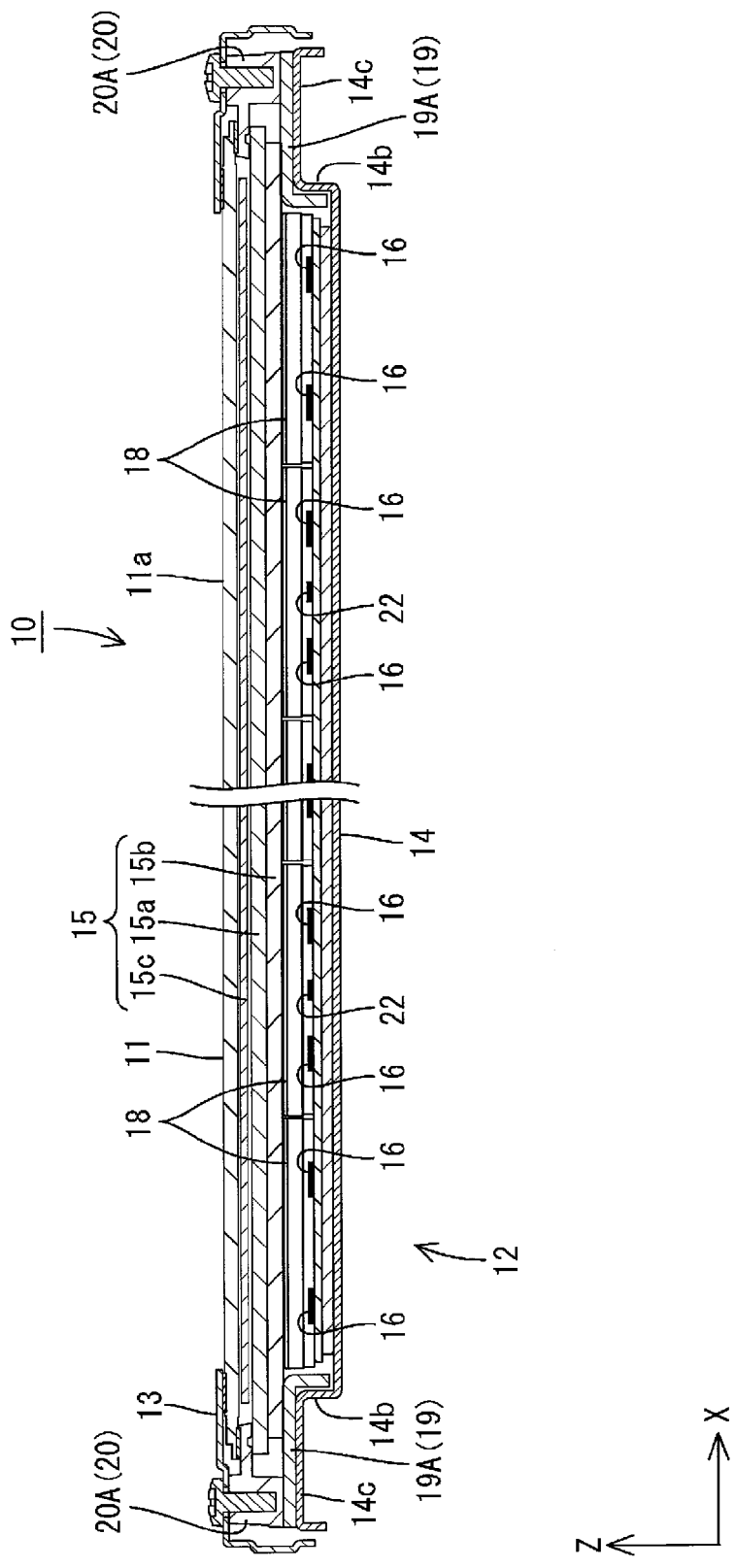
FIG. 4 is a cross-sectional view of a liquid crystal display device along the long side thereof.

Next, the backlight unit 12 will be explained in detail. As illustrated in FIG. 4, the backlight unit 12 includes a chassis 14, an optical member 15, light-emitting diodes (LEDs) 16, LED boards 17 and light guide plates 18. The chassis 14 has a box-like overall shape and an opening on the front side (the liquid crystal panel 11 side, the light-exiting side). The optical member 15 is arranged so as to cover the opening. The LEDs 16 are light sources arranged inside the chassis 14. The LEDs 16 are mounted on the LED boards 17. Rays of light emitted from the LEDs 16 are guided to the optical member 15 by the light guide plates 18. The backlight unit 12 further includes a support member 19, a holddown member 20 and heat sinks 21. The support member 19 holds diffusers 15a and 15b included in the optical member 15 from the chassis 14 side. The holddown member 20 holds down the diffusers 15a and 15b from the liquid crystal panel 11 side. The heat sinks 21 are provided for dissipation of heat generated while the LEDs 16 are lit.

The backlight unit 12 includes a number of unit light emitters arranged in series. Each unit light emitter includes the light guide plate 18 and the LEDs 16 arranged in series. The LEDs 16 are disposed in side-edge areas of each light guide plate 18. A number of the unit light emitters (twenty of them in FIG. 3) are arranged in series along an arrangement direction (an Y-axis direction) in which the LEDs 16 and the light guide plates 18 are arranged in series, that is, in a tandem layout (see FIGS. 7 to 9). Furthermore, the backlight unit 12 includes a number of the unit light emitters (forty of them in FIG. 3) arranged in lines that are parallel to each other in a direction substantially perpendicular to the tandem arrangement direction (the Y-axis direction) and along the display surface 11a (the X-axis direction). Namely, a number of the unit light emitters are arranged in a plane (i.e., in a two-dimensional parallel layout) along the display surface 11a (the X-Y plane) (see FIG. 3).

Figure 8:
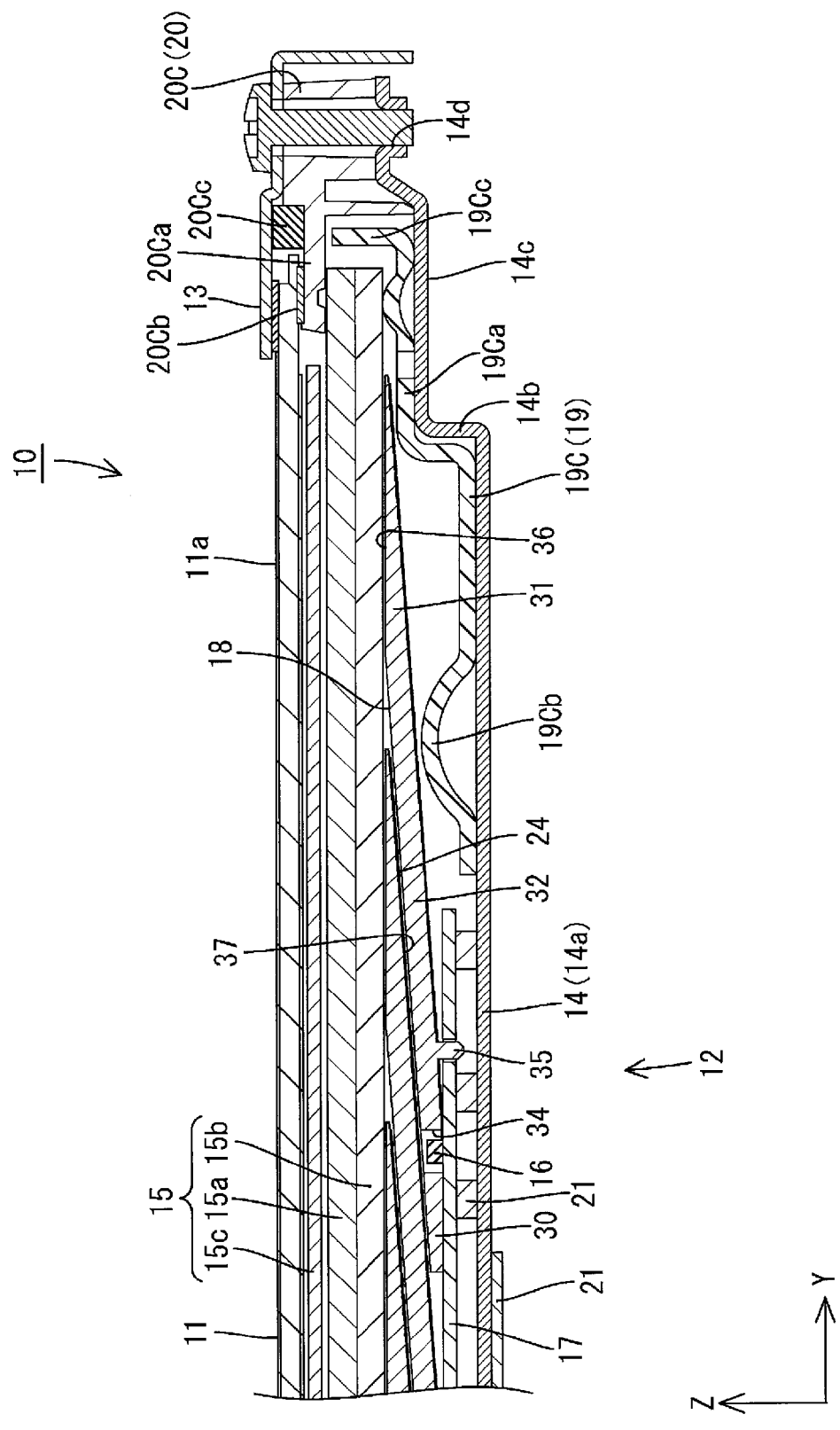
FIG. 8 is a magnified cross-sectional view of an upper-end portion of the liquid crystal display device in FIG. 3 along the short-side direction thereof.

Next, components of the backlight unit 12 will be explained in detail. The chassis 14 is made of metal and has a shallow-box-like overall shape (or a shallow-tray-like overall shape) with the opening on the liquid panel 11 side as illustrated in FIG. 4. The chassis 14 includes a bottom plate 14a, side plates 14b and support plates 14c. The bottom plate 14a has a rectangular shape similar to the liquid crystal panel 11. The side plates 14b rise from the respective edges of the bottom plate 14a. The support plates 14c project outward from the respective end edges of the side plates 14b. The long-side direction and the short-side direction of the chassis 14 correspond to the horizontal direction (the X-axis direction) and the vertical direction (the Y-axis direction), respectively. The support plates 14c of the chassis 14 are formed such that the support member 19 and the holddown member 20 are placed thereon, respectively, from the front-surface side. Each support plate 14c has mounting holes 14d that are through holes for holding the bezel 13, the support member 19 and the holddown member 20 together with screws and formed at predetermined locations. One of the mounting holes 14d is illustrated in FIG. 8. An outer edge portion of each support plate 14c on the long side is folded so as to be parallel to the corresponding side plate 14b (see FIG. 4). The bottom plate 14a has insertion holes 14e that are through holes for inserting clips 23 therein (see FIGS. 5 and 6). The light guide plates 18 are mounted to the chassis with the clips 23. The bottom plate 14a also has mounting holes (not shown). The mounting holes are through holes for mounting the LED boards 17 with screws and formed at predetermined locations.

As illustrated in FIG. 4, the optical member 15 is arranged between the liquid crystal panel 11 and the light guide plates 18. It includes the diffusers 15a and 15b arranged on the light guide plate 18 side, and an optical sheet 15c arranged on the liquid crystal panel 11 side. Each of the diffusers 15a and 15b includes a transparent resin base material with a predefined thickness and a large number of diffusing particles scattered in the base material. The diffusers 15a and 15b have functions of diffusing light that passes therethrough. The diffusers 15a and 15b having the same thickness are placed on top of each other. The optical sheet 15c is a thin sheet having a smaller thickness than that of the diffusers 15a and 15b. The optical sheet 15c includes three sheets placed on top of each other, more specifically, a diffusing sheet, a lens sheet and a reflection-type polarizing sheet arranged in this order from the diffuser 15a or 15b side (i.e., from the rear-surface side).

Figure 3:
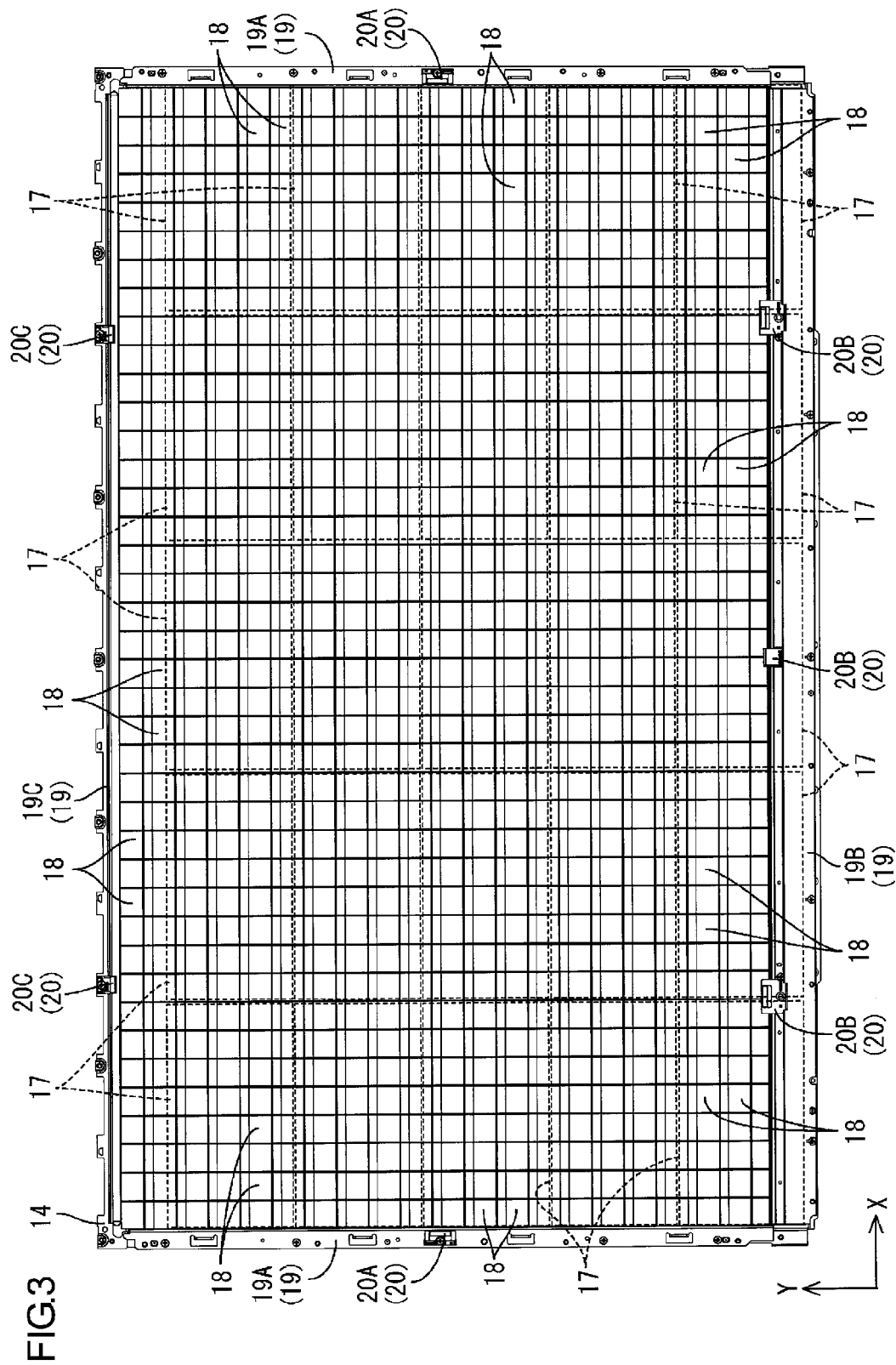
FIG. 3 is a plan view of the backlight unit.

The support member 19 is arranged on outer-edge portions of the chassis 14 so as to support almost entire outer-edge portions of the diffuser plates 15a and 15b. As illustrated in FIG. 3, the support member 19 includes a pair of short-side support parts 19A and two different long-side support parts 19B and 19C. The short-side support parts 19A are arranged so as to extend along the respective short sides of the chassis 14. The long-side support parts 19B and 19C are arranged so as to extend along the respective short sides of the chassis 14. The parts of the support member 19 are configured differently according to mounting locations. The symbols 19A to 19C are used for referring to the parts of the support member 19 independently. To refer to the support member 19 as a whole, the numeral 19 without the letters is used.

Figure 5:
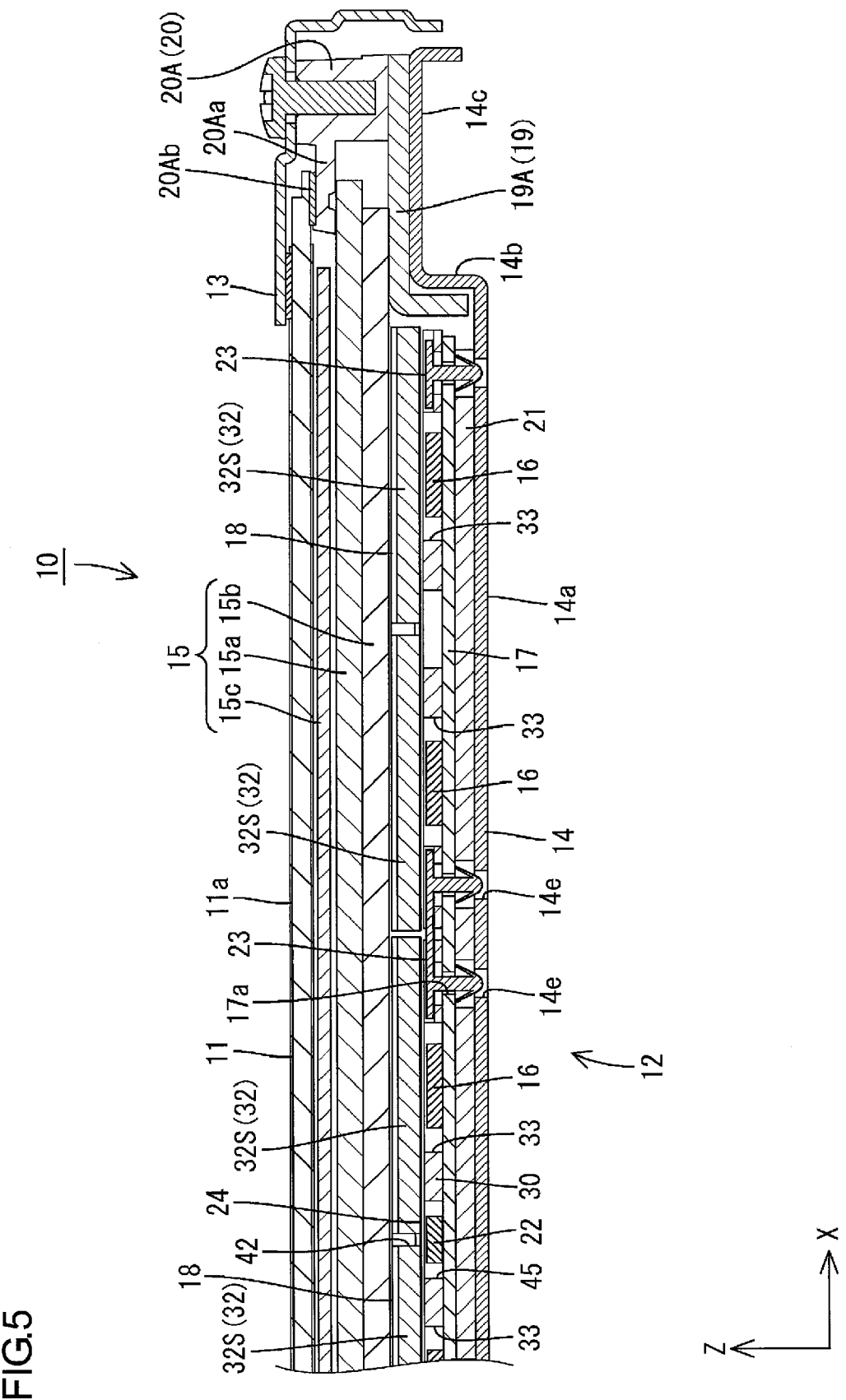
FIG. 5 is a magnified cross-sectional view illustrating an end portion of the liquid crystal display device in FIG. 4.

As illustrated in FIGS. 4 and 5, the short-side support parts 19A have substantially same configurations. Each of them has a substantially L-shape cross section so as to extend along a surface of the support plate 14c and an inner surface of the side plate 14b. A part of each short-side support part 19A parallel to the support plate 14c receives the diffuser 15b in an inner area and a short-side holddown part 20A in an outer area. The short-side holddown part 20A will be explained later. The short-side support parts 19A cover substantially entire lengths of the support plates 14c and the side plates 14b on the short sides.

Figure 7:
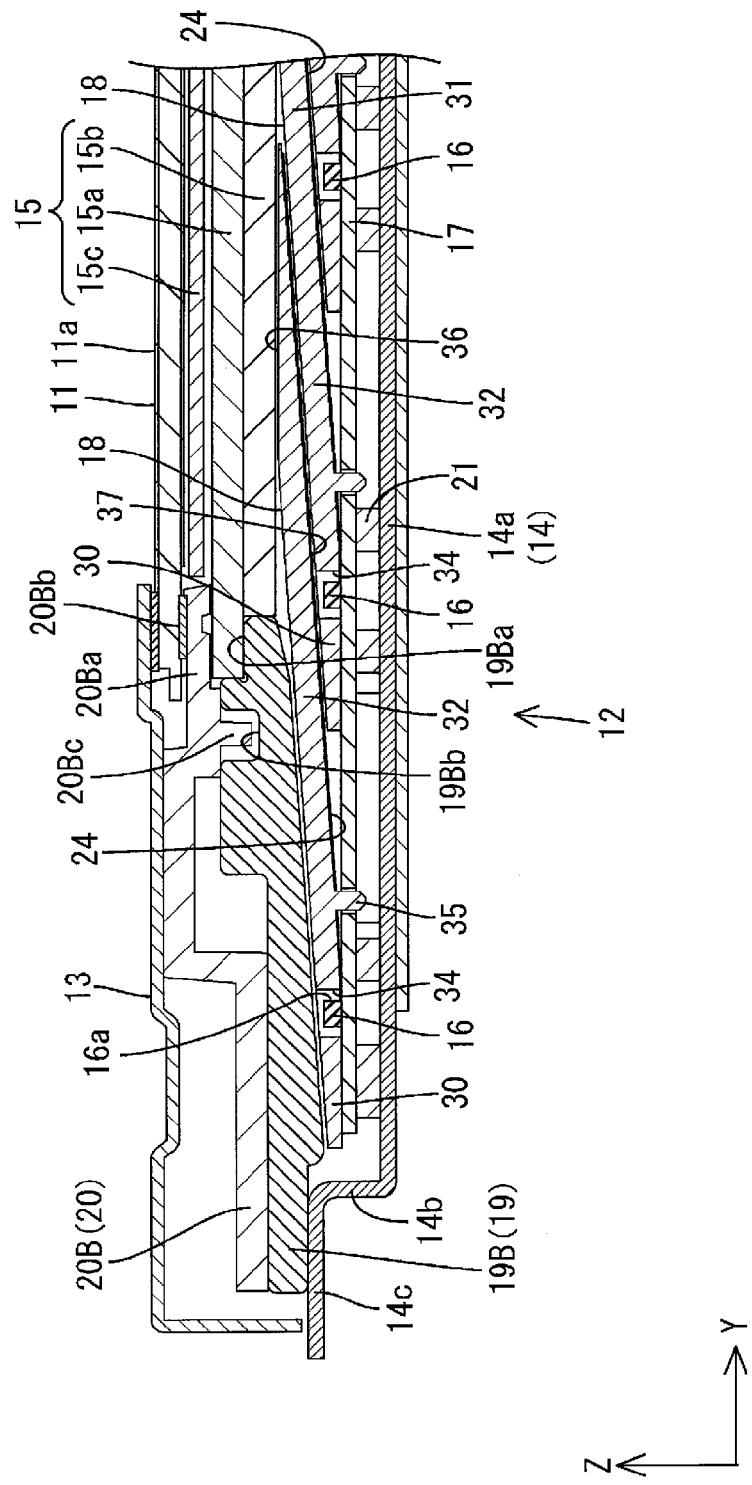
FIG. 7 is a magnified cross-sectional view of a lower-end portion of the liquid crystal display device in FIG. 3 along the short-side direction thereof.

The long-side support parts 19B and 19C are configured differently. Specifically, the first long-side support part 19B is arranged on the lower side in FIG. 3 (the lower side in the vertical direction) of the chassis 14. As illustrated in FIG. 7, it is arranged so as to extend along the inner surface of the support plate 14c and a surface of the adjacent light guide plate 18 located on the front-surface side (a surface opposite from the LED board 17 side). The first long-side support part 19B has a function of pressing the adjacent light guide plate 18 from the front-surface side. The first long-side support part 19B receives the diffuser 15a that is located on the front-surface side in the inner-edge area, and the first long-side holddown part 20B in the outer-edge area. The first long-side holddown part 20B will be explained later. The inner-edge area of the first long-side support part 19B has a stepped portion 19Ba formed so as to correspond to the shape of the outer edge area of the diffuser 15a that is located on the front-surface side. Adjacent to the stepped portion 19Ba, recesses 19Bb for receiving protrusions 20Bc of the first long-side holddown part 20B are formed in the first long-side support part 19B on the outer side with respect to the stepped portions 19Ba. The first long-side holding part 19B covers substantially entire lengths of the support plate 14c on the long side and non-luminous portions of the adjacent light guide plates 18 (a board-mounting portion 30 and a light guide portion 32). The width of the first long-side support part 19B is larger than those of the other support parts 19A and 19C by an area that covers the non-luminous portion.

The second long-side support part 19C is arranged on the upper side of the chassis 14 in FIG. 3 (the upper side in the vertical direction). As illustrated in FIG. 8, the second long-side support part 19C has a crank-like cross section. It is arranged along the inner surfaces of the support plate 14c, the side plate 14b and the bottom plate 14a. A diffuser support protrusion 19Ca is formed in an area of the long-side support part 19C parallel to the support plate 14c so as to protrude on the front-surface side. The diffuser support protrusion 19Ca has an arch-shaped cross section. It is brought into contact with the diffuser 15b on the rear-surface side from the rear-surface side. A light guide plate support protrusion 19Cb is formed in an area of the second long-side support part 19C parallel to the bottom plate 14a so as to protrude on the front-surface side. The light guide plate support protrusion 19Cb has an arch-shaped cross section. It is brought into contact with the adjacent light guide plate 18 from the rear-surface side. The second long-side support part 19C has functions of receiving the diffusers 15a and 15b (i.e., support functions) and light guide plate 18. An area of the second long-side holding part 19C parallel to the support plate 14c and inside with respect to the diffuser support protrusion 19Ca is brought into contact with the end portion of the light guide plate 18 from the rear-surface side. The light guide plate 18 is supported at two points: at the end portion with the support protrusion 19Ca and at the base portion with the light guide support protrusion 19Cb. The second long-side support part 19C covers substantially entire areas of the support plate 14c and the side plate 14b on the long side. A projecting portion 19Cc rises from the outer edge of the second long-side holding part 19C so as to face the end surfaces of the diffusers 15a and 15b.

As illustrated in FIG. 3, the holddown member 20 is arranged on outer-edge areas of the chassis 14. A width of the holddown member 20 is smaller than a dimension of the corresponding sides of the chassis 14 and the diffusers 15a and 15b. Therefore, the holddown member 20 presses parts of the outer-edge portion of the diffusers 15a. The holddown member 20 includes short-side holddown parts 20A arranged on the respective short-edge area of the chassis 14 and a plurality of long-side holddown parts 20B and 20C arranged on each long-edge area of the chassis 14. The parts of the holddown member 20 are configured differently according to mounting locations. The symbols 20A to 20C are used for referring to the parts of the holddown member 20 independently. To refer to the holddown member 20 as a whole, the numeral 20 without the letters is used.

The short-side holddown parts 20A are arranged around central portions of the respective short-edge areas of the chassis 14. They are placed on the outer-edge portions of the short-side support parts 19A and fixed with screws. As illustrated in FIGS. 4 and 5, each short-side holddown part 20A has a holding tab 20Aa that projects inward from a body that is screwed. The diffuser 15a is pressed by edge areas of the holding tabs 20Aa from the front-surface side. The liquid crystal panel 11 is placed on the holding tabs 20Aa from the display surface side and held between the bezel 13 and the holding tabs 20Aa. Cushion materials 20Ab for the liquid crystal panel 11 are arranged on surfaces of the holding tabs 20Aa.

The long-side holddown parts 20B and 20C are configured differently. The first long-side holddown parts 20B are arranged on the lower side of the chassis 14 in FIG. 3 (the lower side in the vertical direction). As illustrated in FIG. 3, three long-side holddown parts 20B are arranged at substantially equal intervals. One of them is arranged around the middle of the long-side-edge area of the chassis 14 on the lower side in FIG. 3 and the other two are arranged on either side of the one arranged in the middle. They are placed on the outer-edge area of the first long-side support part 19B and screwed. As illustrated in FIG. 7, each long-side holding part 20B has a holding tab 20Ba on the inner side similar to the short-side holding parts 20A. A surface of the holding tab 20Ba on the rear-surface side presses the diffuser 15a. Surfaces on the front-surface side receive the liquid crystal display panel 11 via cushion materials 20Bb. The long-side holddown parts 20B has widths larger than those of the other holddown parts 20A and 20C so as to correspond to the first long-side support parts 19B. Protrusions 20Bc for positioning the first long-side holddown parts 20B relative to the first long-side support parts 19B are formed on the surfaces of the long-side holddown parts 20B on the rear-surface side.

The long-side holddown parts 20C are arranged on the upper side of the chassis 14 in FIG. 3 (the upper side in the vertical direction). As illustrated in FIG. 3, two long-side holddown parts 20C are arranged in a long-edge area of the chassis 14 on the upper side in FIG. 3. They are directly placed on the support plate 14c of the chassis 14 and screwed. As illustrated in FIG. 8, each long-side holddown part 20C has a holding tab 20Ca on the inner side, similar to the short-side holddown parts 20A and the first long-side holing parts 20B. Surfaces of the holding tabs 20Ca on the rear-surface side press the diffuser 15a and the surfaces on the front-surface side receive the liquid crystal panel 11 via cushion materials 20Cb. Other cushion materials 20Cc are provided between the holding tabs 20Ca of the second long-side holddown parts 20C and the bezel 13.

The heat sinks 21 are made of synthetic resin or metal having high thermal conductivity and formed in a sheet-like shape. As illustrated in FIGS. 5 and 7, the heat sinks 21 are arranged inside and outside the chassis 14, respectively. The heat sink 21 inside the chassis 14 is placed between the bottom plate 14a of the chassis 14 and the LED boards 17. It has cutouts in some areas to avoid other components. The heat sink 21 outside the chassis 14 is attached to the rear surface of the bottom plate 14a of the chassis 14.

Figure 10:
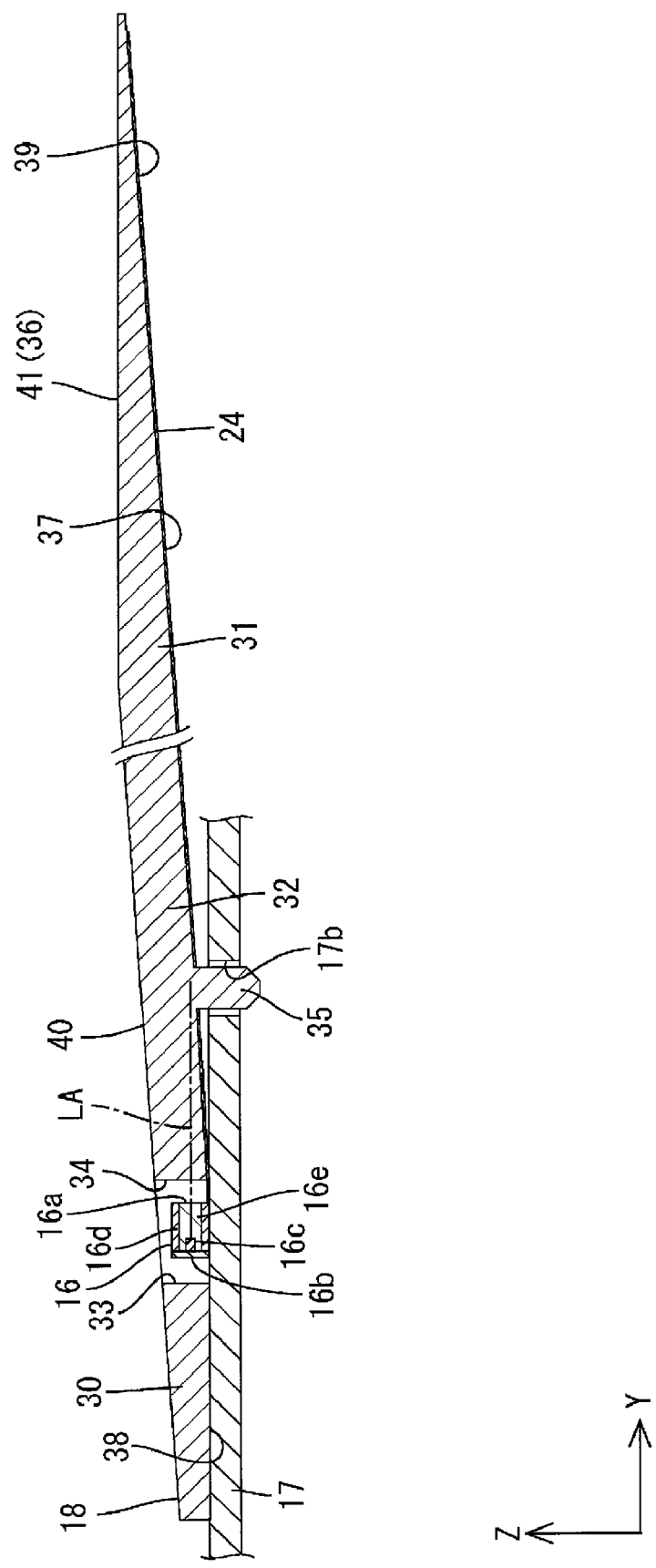
FIG. 10 is a magnified cross-sectional view of a light guide plate in FIG. 9.

As illustrated in FIG. 10, the LEDs 16 are surface-mounted to the LED boards 17, that is, the LEDs 16 are surface-mount LEDs. Each LED 16 has a block-like overall shape that is long in the horizontal direction. The LEDs 16 are side emitting LEDs. A side surface of each LED 16 that stands upright from a mounting surface is a light-emitting surface 16a. The mounting surface is placed against the LED board 17 (i.e., the bottom surface is that is in contact with the LED board 17). A light axis LA of light emitted from the LED 16 is substantially parallel to the display surface 11a of the liquid crystal display panel 11 (the light exit surface 36 of the light guide plate 18) (see FIGS. 7 and 10). Specifically, the light axis LA of the light emitted from the LED 16 matches the short-side direction (the Y-axis direction) of the chassis 14, that is, the vertical direction. The light travels toward the upper side in the vertical direction (a travel direction of the outgoing light from the light exit surface 16a) (see FIGS. 3 and 7). The light emitted from the LED 16 three-dimensionally radiates around the light axis LA in a specified angle range. The directivity thereof is higher than cold cathode tubes. Namely, angle distributions of the LED 16 shows a tendency that the emission intensity of the LED 16 is significantly high along the light axis LA and sharply decreases as the angle to the light axis LA increases. The longitudinal direction of the LED 16 matches the long-side direction of the chassis 14 (the X-axis direction).

As illustrated in FIG. 10, the LED 16 includes a plurality of LED chips 16c mounted on a board 16b that is arranged on an opposite side from the light-emitting surface 16a (the rear-surface side). The LED chips 16c are light-emitting components. The LED 16 is housed in the housing 16d and an inner space of the housing 16d is closed with a transparent (highly capable of light transmission) resin member 16e. The LED 16 includes three different kinds of the LED chips 16c with different main emission wavelengths. Specifically, each LED chip 16c emits a single color of light of red (R), green (G) or blue (B). The LED chips 16c are arranged parallel to each other along the longitudinal direction of the LED 16. The housing 16d is in white that provides high light reflectivity. The housing 16d is formed in a drum-like shape that is long in the horizontal direction and opens at ends thereof in a direction parallel to the light axis LA (i.e., it opens toward the light exit surface 16a and the board 16a, respectively). The light exit surface 16a is defined with the opening edge 16da. Namely, a surface of the resin member 16e inside the opening edge 16da of the housing 16d on an opposite side from the board 16b (i.e., the front side) is the light exit surface 16a. The rear surface of the board 16b is soldered to a land on the LED board 17.

Each LED board 17 is made of resin and the surfaces thereof (including a surface facing the light guide plate 18) are in white that provides high light reflectivity. As illustrated in FIG. 3, the LED board 17 is formed in a plate-like shape having a rectangular plan view. The LED board 17 has a long dimension smaller than the short dimension of the bottom plate 14a and thus it can partially cover the bottom plate 14a of the chassis 14. The LED boards 17 are in a plane arrangement in a grid pattern on the surface of the bottom plate 14a of the chassis 14. In FIG. 3, five along the long-side direction of the chassis 14 by five along the short-side direction and a total of 25 LED boards 17 are arranged parallel to each other. Wiring patterns that are metal films are formed on each LED board 17 and the LEDs 16 are mounted in predetermined locations on the LED board 17. The LED boards 17 are connected to an external control board, which is not illustrated in the figures. The control board is configured to feed currents for turning on the LEDs 16 and to perform driving control of the LEDs 16. A number of LEDs 16 are arranged in a planar grid pattern on each LED board 17. The arrangement pitch of the LEDs 16 corresponds to the arrangement pitch of the light guide plates 18, which will be explained later. Specifically, eight along the long-side direction of the LED board 17 by four along the short-side direction thereof and a total of 32 LEDs 16 are arranged parallel to each other on the LED board 17. Photo sensors 22 are also mounted on the respective LED boards 17. Light emitting conditions of the LEDs 16 are determined by the photo sensors 22 and thus feedback control can be performed on the LEDs 16 (see FIGS. 4 and 12). Each LED board 17 has mounting holes 17a for receiving the clips 23 for mounting the light guide plates 18 (see FIG. 6). It also has positioning holes 17b for positioning the light guide plates 18 (see FIG. 10). The holes are formed in locations corresponding to mounting locations of the light guide plates 18.

Figure 9:
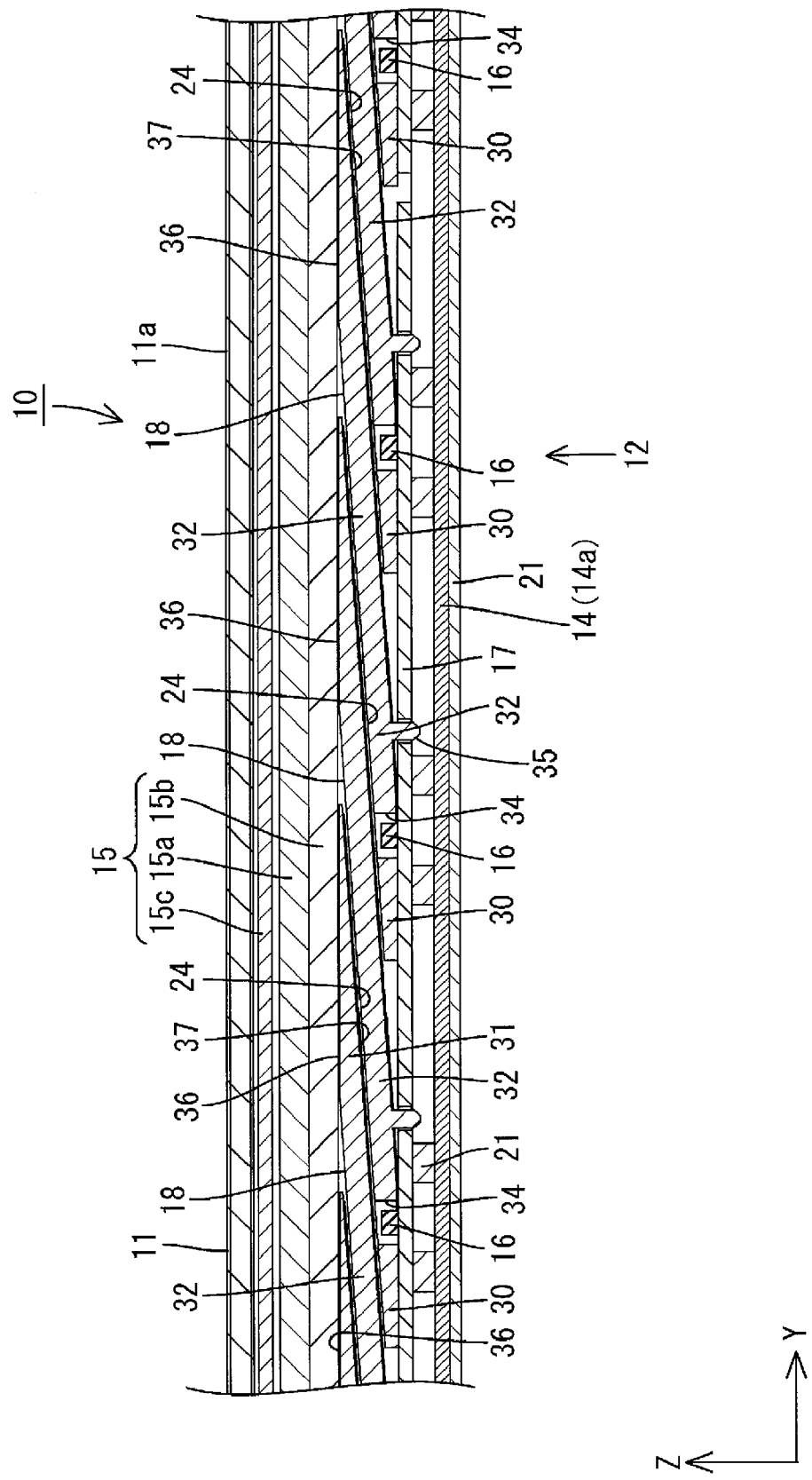
FIG. 9 is a magnified cross-sectional view of a middle portion of the liquid crystal display device along the short-side direction thereof.
Figure 13:
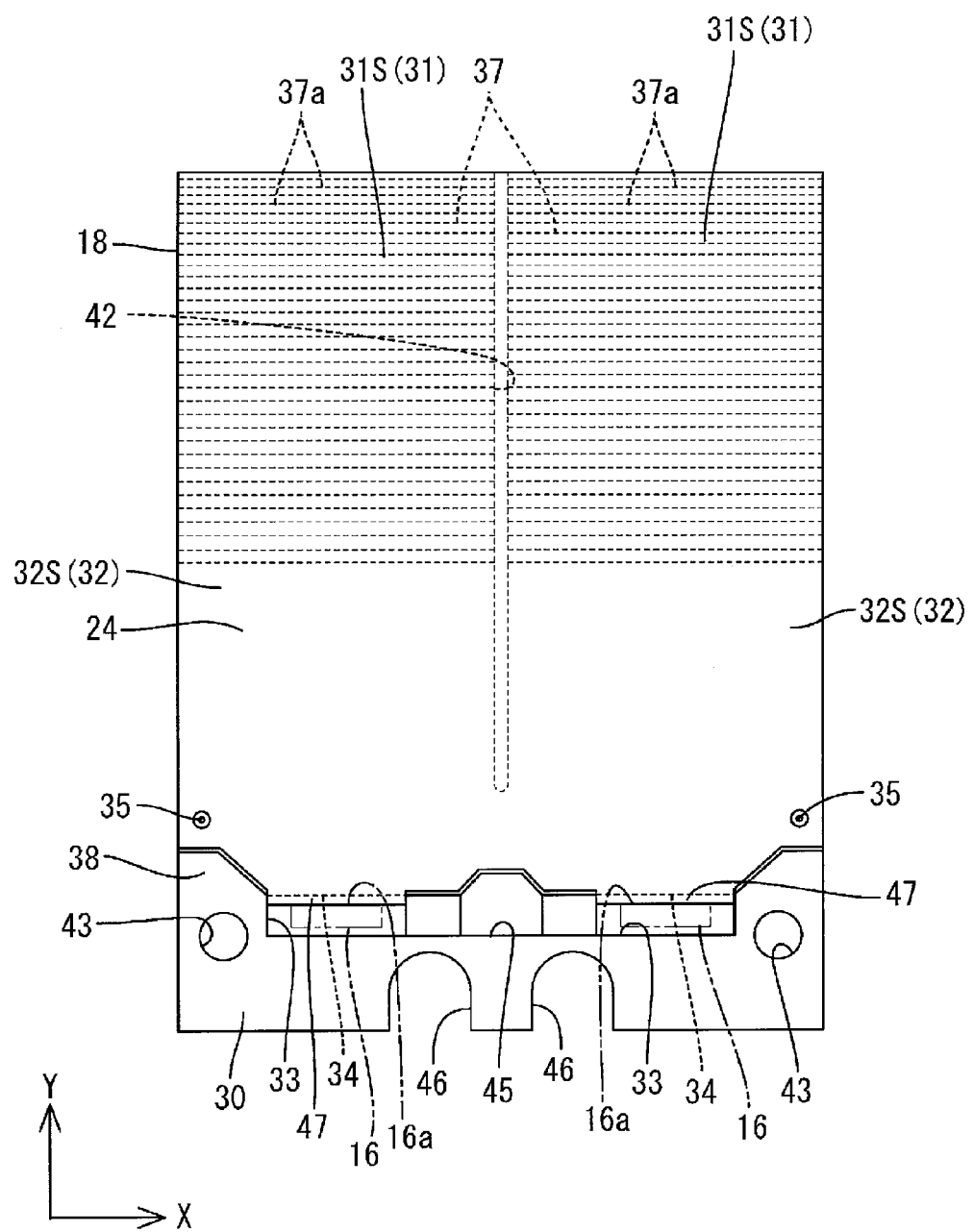
FIG. 13 is a bottom view of the light guide plate.

Each light guide plate 18 is made of substantially transparent (i.e., high capable of light transmission) synthetic resin (e.g. polycarbonate), a reflective index of which is significantly higher than that of air. As illustrated in FIGS. 7 to 9, the light guide plate 18 draws the light emitted from the LED 16 in the vertical direction (the Y-axis direction), transmit the light therethrough (in the planar direction of the panel (the X-Y plane)) and directs it toward the optical member 15 (in the Z direction). As illustrated in FIG. 13, the light guide plate 18 has a plate-like shape having a rectangular overall plan view. The long-side direction of the light guide plate 18 is parallel to the light axis LA of the LED 16 (the light emitting direction) and the short-side direction of the chassis 14 (the Y-axis direction or the vertical direction). The short-side direction is parallel to the long-side direction of the chassis 14 (the X-axis direction or the horizontal direction). Next, a cross-sectional structure of the light guide plate 18 along the long-side direction will be explained in detail.

As illustrated in FIGS. 7 to 9, each light guide plate 18 has a board-mounting portion 30 that is located at one of end portions of the long dimension (on the LED 16 side) and attached to the LED board 17. The other end portion of the long dimension is configured as a light exit portion 31 from which light exits toward the diffusers 15*a* and 15*b*. The middle portion between the board-mounting portion 30 and the light exit portion 31 is configured as a light guide portion 32. The light guide portion 32 is configured to direct the light to the light exit portion 31 without losing most of the light. Namely, the board-mounting portion 30, the light guide portion 32 and the light exit portion 31 are arranged in this order from the LED 16 side along the long-side direction of the light guide plate 18, that is, along the light axis LA (the light emitting direction) of the LED 16. The board-mounting portion 30 and the light guide portion 32 are non-luminous portions. The light exit portion 31 is a luminous portion. In the following description, a point ahead in a direction from the board-mounting portion 30 toward the light exit portion 31 (the light emitting direction of the LED 16 or the direction toward right in FIGS. 7 to 9) is referred to as the front. A point behind in a direction from the light exit portion 31 toward the board-mounting portion 30 (the direction toward left in FIGS. 7 to 9) is referred to as the rear.

In front of the board-mounting portion 30, an LED holding space 33 is formed so as to run through in the Z-axis direction. A surface of one of inner walls of the LED holding space 33, which faces the light-emitting surface 16*a* of the LEC 16 (i.e., the front surface), is a light entrance surface 34 through which light from the LED 16 enters. The light entrance surface 34 is located between the board-mounting portion 30 and the light guide portion 32. About entire peripheries of the light guide portion 32 are flat and smooth surfaces. Scattered reflections do not occur at interfaces (between the surfaces and external air layers). Incident angles of light that strikes the interfaces are larger than a critical angle and thus the light is totally reflected at multiple times while traveling through the light guide portion 32 and guided to the light exit portion 31. Therefore, the light is less likely to leak from the light guide portion 32 and reach other light guide plates 18. The LED chips 16*c* of the LED 16 emits rays of light in respective RGB colors. Three different colors of the rays are mixed as the rays of light travel through the light guide portion 32 and turn into white. The white light is guided to the light exit portion 31. Furthermore, positioning pin 35 protrudes toward the rear-surface side. It is located in an area of the light guide portion 32 close to the board-mounting portion (close to a rear-end area). The light guide plate 18 is positioned relative to the LED board 17 in the X-axis direction and the Y-axis direction when the protrusion 35 is inserted in the positioning hole 17*b* of the LED board 17.

A surface of the light exit portion 31 which faces toward the display surface side is about an entire area of the surface opposite the diffuser 15*b* is a light exit surface 36. The light exit surface 36 is a substantially flat and smooth surface. It is substantially parallel to the plate surfaces of the diffusers 15*a* and 15*b* (or the display surface 11*a* of the liquid crystal display panel 11) and perpendicular to the light entrance surface 34. The surface of the light exit portion 31 on the rear-surface side (the surface opposite from the light exit surface 36 or the surface facing the LED board 17) is processed so as to form microscopic asperities thereon. The surface with microscopic asperities is a scattering surface 37 that scatters light at the interface. The light that travels through the light guide plate 18 is scattered by the interface of the scattering surface 37. Namely, light rays strike the light exit surface 36 at the incident angles smaller than the critical angle (light rays that break the total reflection) and exit through the light exit surface 36. The scattering surface 37 has a plurality of lines of perforations 37*a* that extend straight along the short-side direction of the light guide plate 18 and parallel to each other. The arrangement pitch (the arrangement interval) of the perforations 37*a* is larger on the rear-end side of the light exit portion 31 than on the front-end side and gradually decreases (see FIG. 13). Namely, the density of the perforations 37*a* of the scattering surface 37 is low on the rear-end side and that is high on the front side. The closer to the LED 16 the lower the density becomes, and the farther from the LED 16 the higher the density becomes, that is, the perforations 37*a* formed in a gradational arrangement. With this configuration, brightness in the area of the light exit portion 31 closer to the LED 16 is less likely to differ from brightness in the area of the light exit portion 31 father from the LED 16. As a result, the uniform in-plane brightness distribution can be achieved on the light exit surface 36. The scattering surface 37 is provided in the about entire area of the light exit portion 31. The entire area substantially overlaps the light exit surface 36 in the plan view.

A reflection sheet 24 is placed on surfaces of each light exit portion 31 and each light guide portion 32 (including the scattering surface 37) on the rear-surface side. The reflection sheet 24 is made of synthetic resin and the surface thereof is white that provides high light reflectivity. The reflection sheet 24 is disposed so as to cover about entire areas of the light exit portion 31 and the light guide portion 32 in the plan view (see FIG. 13). With the reflection sheet 24, the light that travels through the light guide plate 18 does not leak to the rear-surface side and the light that is scattered at the scattering surface 37 is effectively directed toward the light exit surface 36. The reflection sheet 24 is attached to the light guide plate 18 with adhesives at points in side-edge areas that are less likely to interfere with light that travels through the light guide plate 18. The reflection sheet 24 has holes through which the positioning pins 35 are passed. The side-edge surfaces and the front-end surface of each light exit portion 31 are flat and smooth surfaces similar to those of the light guide portion 32. Therefore, light is less likely to leak.

As illustrated in FIG. 10, the light guide plate 18 has flat surfaces 38 and 41 on the front-surface side (the surface opposite the diffusers 15*a* and 15*b*, including the light exit surface 36) and on the rear-surface side (the surface opposite the LED board 17), respectively. The flat surfaces 38 and 41 are substantially parallel to the X-Y plane (or the display surface 11*a*). The light guide plate 18 also has sloped surfaces 39 and 40. The sloped surfaces 39 and 40 are sloped with respect to the X-axis and the Z-axis. Specifically, the surface of the board-mounting portion 30 on the rear-surface side is a mounting surface that is placed on the LED board 17. To make the mounting condition stable, the flat surface 38 (the surface parallel to the main board surface of the LED board 17) is provided. The surfaces of the light guide portion 32 and the light exit portion 31 on the rear-surface side form a continuous sloped surface 39. The board-mounting portion 30 of the light guide plate 18 is in contact with the LED board 17 and fixed. The light guide portion 32 and the light exit portion 31 are separated from the LED board 17, that is, they are not in contact with the LED board 17. The light guide plate 18 is held in a cantilever manner with the board-mounting portion 30 on the rear side as an anchoring point (or a supporting point) and a front end as a free end.

The surfaces of entire parts of the board-mounting portion 30 and the light guide portion 32 and a part of the light exit portion 31 close to the light guide portion 32 on the front-surface side form the continuous sloped surface 40. The sloped surface 40 is sloped at about the same angle and parallel with respect to the sloped surface 39 on the rear-surface side. Namely, the thickness of the light guide plate 18 is substantially constant in the entire light guide portion 32 and a part of the light exit portion 31 close to the light guide portion 32 (close to the LED 16). The surface of the light exit portion 31 on the front side (away from the LED 16) on the front-surface side is the flat surface 41. Namely, the light exit surface 36 includes the flat surface 41 and the sloped surface 40. Most part of the light exit surface 36 on the front side is the flat surface 41 and a part thereof on the light guide portion 31 side is the sloped surface 40. The thickness of the board-mounting portion 30 decreases toward the rear end (as further away from the light guide portion 32), that is, the board-mounting portion 30 has a tapered shape. A part of the light exit portion 31 adjacent to the light guide portion 32 has the sloped surface 40 on the front-surface side and thus the thickness thereof is constant. A part of the light exit portion 31 located more to the front than the above part has the flat surface 41 on the front-surface side. Therefore, the thickness gradually decreases toward the front end (as further away from the light guide portion 32), that is, the light exit portion 31 has a tapered shape. A long dimension (a dimension measuring in the Y-axis direction) of the flat surface 41 on the front-surface side is smaller than that of the flat surface 38 on the rear-surface side. Therefore, the front-end area of the light exit portion 31 is smaller in thickness than the rear-end area of the board-mounting portion 30. Moreover, a surface area of the front-end area of the light exit portion is smaller than that of the rear-end area of the board-mounting portion 30. All peripheral surfaces of each light guide plate 18 (including side surfaces and a front surface) are vertically straight surfaces.

As illustrated in FIG. 13, each light guide plate 18 having the above described cross-sectional structure has a pair of LED holding spaces 33 for holding the LEDs 16. Rays of light from the respective LEDs 16 enter the light guide plate 18. The rays from two different LEDs 16 are guided to the diffusers 15*a* and 15*b* in conditions that they are optically independent from each other. The components of the light guide plate 18 will be explained in detail along the planar layout thereof.

The light guide plate 18 has a symmetric shape with a line that passes through the meddle of the short side (in the X-axis direction) as a line of symmetry. The LED holding spaces 33 of the board-mounting portion 30 are arranged symmetrically a predetermined distance away from the middle of the short side (in the X-axis direction) of the light guide plate 18. Each LED holding space 33 has a landscape rectangular shape in plan view and a size slightly larger than an overall size of the LED 16. The height (the dimension measuring in the Z-axis direction) and the width (the dimension measuring in the X-axis direction) are slightly larger than those of the LED 16. The surface area of the light entrance surface 34 is significantly larger than the light exit surface 16*a*. Therefore, the rays of light emitted radially from the LED 16 enter the light guide plate 18 without any loss.

At the middle of a short dimension of the light guide plate 18, a slit 42 is formed so as to divide the light guide portion 32 and the light exit portion 31 into right and left. The slit 42 runs through the light guide plate 18 in the thickness direction (the Z-axis direction) and toward the front along the Y-axis direction with a constant width. Edge surfaces of the light guide plate 18, which face the slit 42, form side-edge surfaces of the divided light guide portion 32S and the divided light exit portion 31S. Each side-edge surface includes a flat surface that is substantially straight along the Z-axis direction and a curved surface. The rays of light passing through the light guide plate 18 totally reflect off an interface between the light guide plate 18 and the air layer AR in the slit 42. Therefore, the rays of light do not travel or mix together between the divided light guide portions 32S that faces each other via the slit 42 or between the divided light exit portions 31S that faces each other via the slit 42. The divided light guide portions 32S and the divided light exit portions 31A are optically independent from each other. The rear end of the slit 42 is slightly more to the front than the positioning pin 35 and more to the rear than a lighting area of each LED 16 (the area within an angular range with the light axis LA of the LED 16 as the center and indicated by alternate long and short dash lines in FIG. 12). With this configuration, the rays of light emitted from the LED 16 do not directly enter the adjacent divided light guide portion 32S that is not a target to be illuminated. The positioning pins 35 are symmetrically located on the outer end areas of the divided light guide portions 32S (the end portions away from the slit 42) more to the rear than the lighting areas of the respective LEDs 16. Therefore, the positioning pins 35 are less likely to be obstacles in optical paths. The slit 42 does not run to the board-mounting portion 30. Therefore, the divided light guide portions 32 connect to each other and continue into the board-mounting portion 30. This provides mechanical stability in mounting conditions. The light guide plate 18 includes two unit light guide plates 18*a* and 18*b* (corresponding to the divided light guide portion 32S and the divided light exit portion 31S). The unit light guide plates are optically independent from each other and provided each for each LED 16. The unit light guide plates are connected to each other together with the board-mounting portion 30. This simplifies mounting of the light guide plate 18 to the LED board 17. The reflection sheet 24 is placed over the slit 42 (see FIG. 13).

Figure 6:
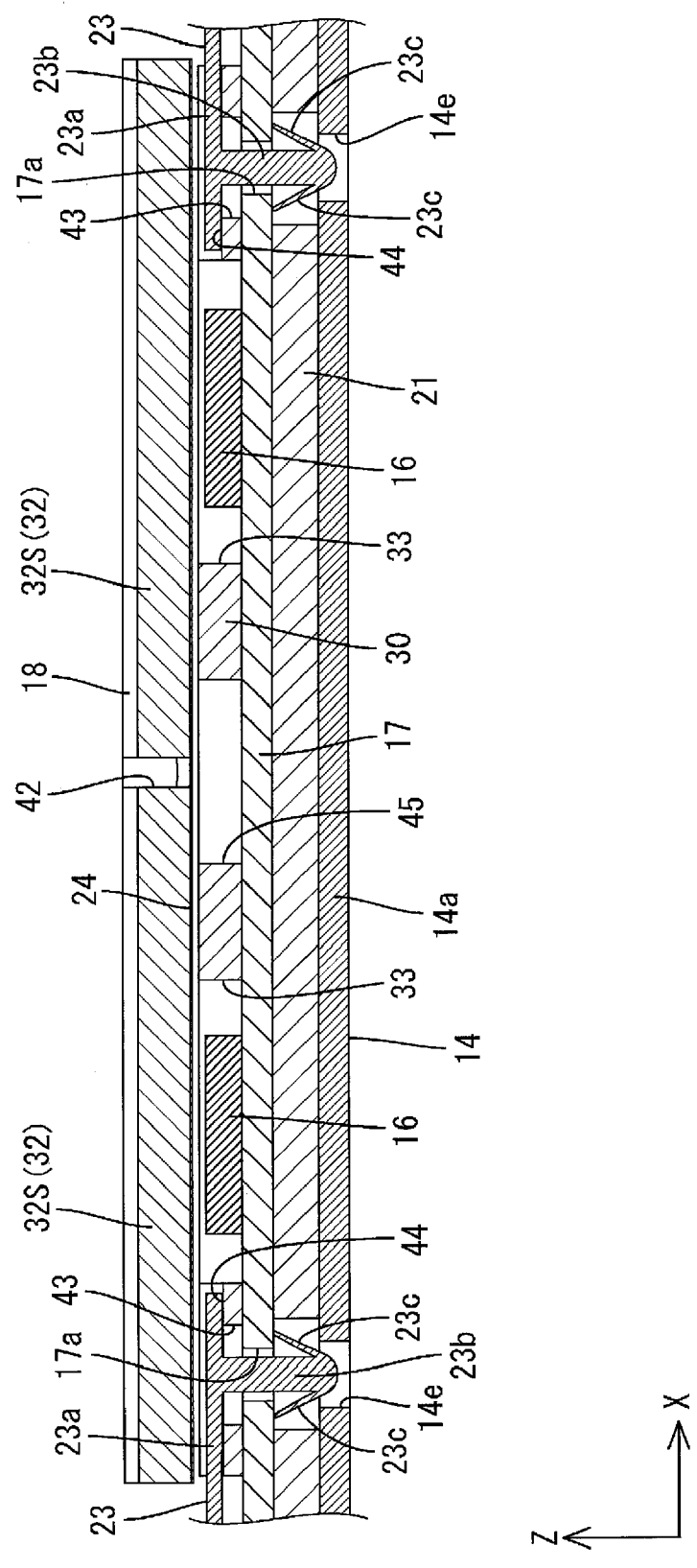
FIG. 6 is a magnified cross-sectional view of a light guide plate illustrated in FIG. 5.
Figure 11:
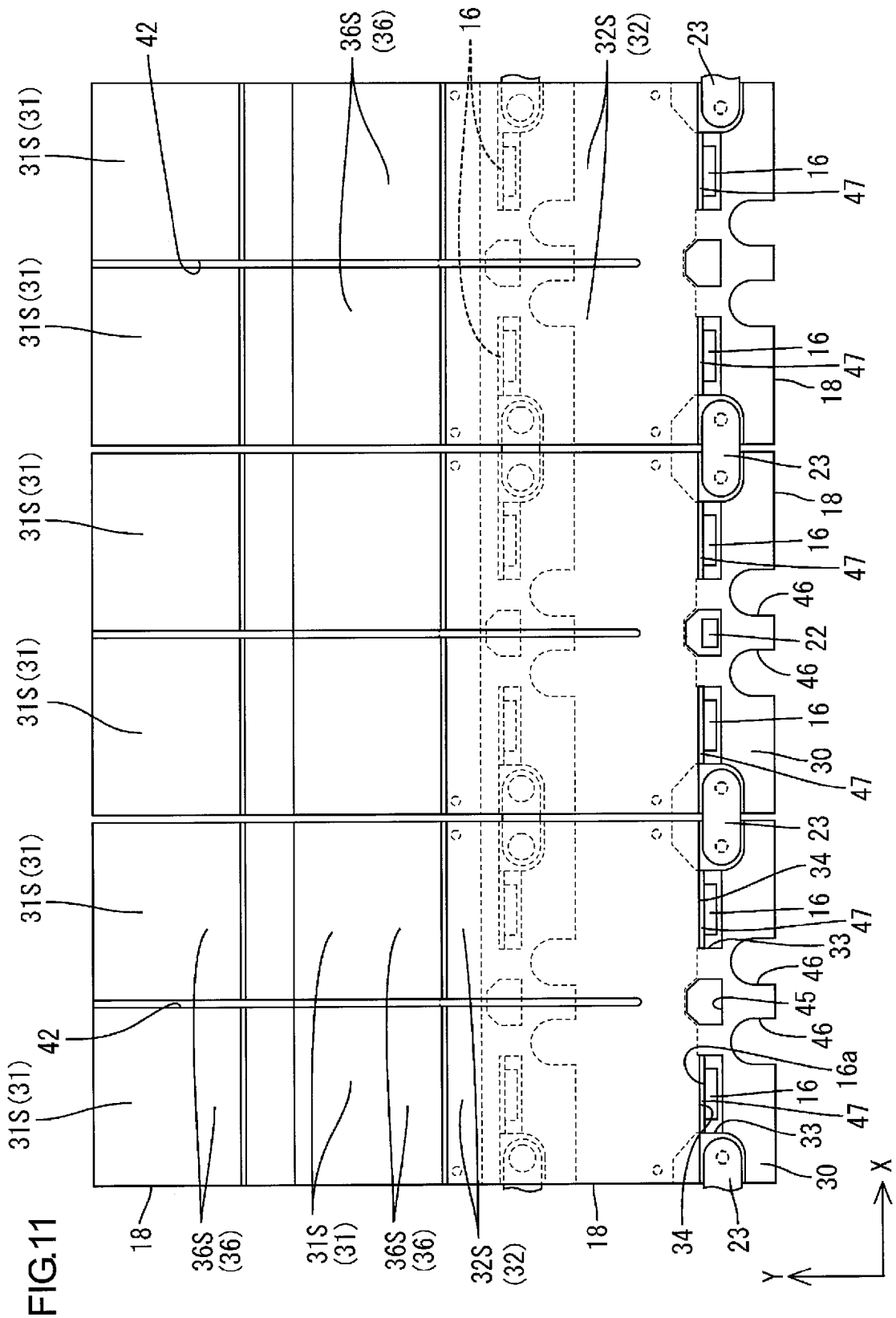
FIG. 11 is a plan view illustrating a layout of light guide plates.
Figure 12:
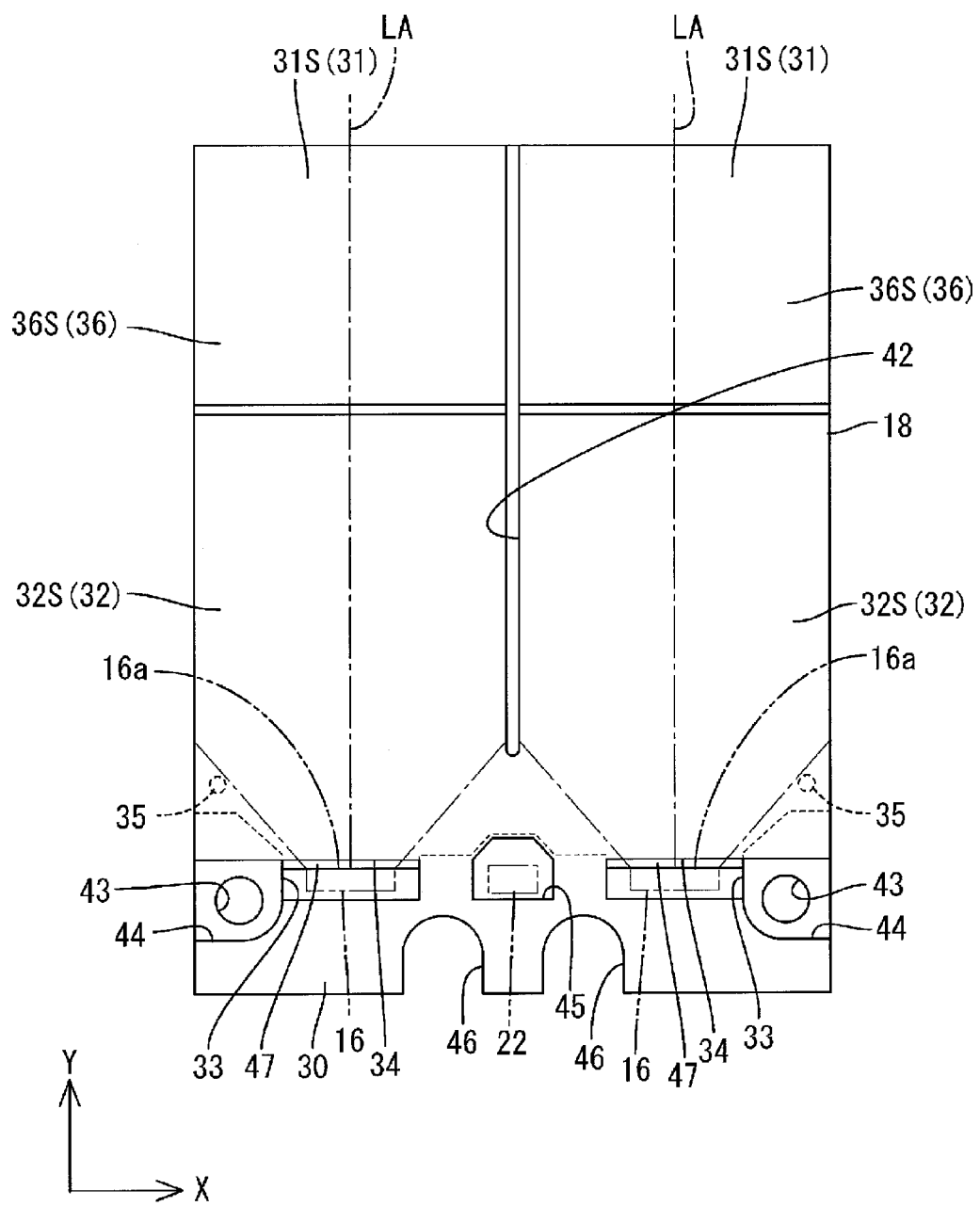
FIG. 12 is a plan view of the light guide plate.

Clip insertion holes 43 are formed in the side-edge areas of the board-mounting portion 30 (in the areas more to the outsides than the LED holding space 33). The clip mounting holes 43 are through holes provided for mounting the light guide plate 18 to the LED board 17. As illustrated in FIG. 6, each clip 23 includes a mounting plate 23*a*, an insertion post 23*b* and a pair of stoppers 23*c*. The mounting plate 23*a* is parallel to the board-mounting portion 30. The insertion post 23*b* projects from the mounting plate 23*a* in the thickness direction (the Z-axis direction) of the board-mounting portion 30. The stoppers 23*c* project from an end of the insertion post 23*b* so as to return toward the mounting plate 23*a*. The insertion post 23*b* of the clip 23 is inserted in the clip insertion hole 43 of the board-mounting portion 30 and the mounting hole 17*a* of the LED board 17. The stoppers 23*c* of the clip 23 are held to the edge portions around the mounting hole 17*a*. As a result, the light guide plate 18 is mounted and fixed to the LED board 17. As illustrated in FIGS. 5 and 11, one kind of the clips 23 has a single insertion post 23*b* projecting from the mounting plate 23*a* and the other kind has two insertion posts 23*b* projecting from the mounting plate 23*a*. The first kind of the clips 23 are inserted in the clip insertion holes 43 located in the end areas inside the chassis 14. The other kind of the clips 23 are arranged so as to connect two light guide plates 18 that are parallel to each other and thus the two light guide plates 18 are collectively mountable. As illustrated in FIGS. 6 and 12, clip receiving recesses 44 for receiving the mounting plates 23*a* of the clips 23 are provided around the clip insertion holes 43. With the clip receiving recesses 44, the mounting plates 23a do not project from the board-mounting portions 30 toward the front and thus spaces can be reduced, that is, the thickness of the backlight unit 12 can be reduced.

The flat surface 38 in the rear surface of each light guide plate 18 is formed so as to surround the rims of the insertion holes 43 (see FIG. 13). When the light guide plate 18 is fixed to the LED board 17 with clips 23, the entire rims of the insertion holes 43 have surface contact with the LED board 17. Therefore, the light guide plate 18 is stably fixed to the LED board 17. The flat surface 38 is formed in the entire area of the board-mounting portion 30 and a part of the light guide portion 32.

As illustrated in FIG. 13, each board-mounting portion 30 has a photo sensor holding space 45 between the LED holding spaces 33. The photo sensor holding space 45 is a through hole for holding the photo sensor 22 mounted on the LED board 17. The predetermined number of the photo sensors 22 is provided. They are arranged irregularly, that is, between specific LEDs on the LED boards 17. Namely, some photo sensor holding spaces 45 of the light guide plates 18 in the chassis 14 do not hold the photo sensors 22. Each board-mounting portion 30 has cutouts 46 in an area closer to the rear than the photo sensor holding spaces 33. The cutouts 46 are located symmetrically. Each cutout 46 runs completely through the board-mounting portion 30 and opens to the rear. A screw (not shown) for fixing the LED board 17 to the chassis 14 is inserted in the cutout 46. Some of the cutouts are not used for light guide plates 18 in the chassis 14, as some photo sensor holding spaces 45 are not used.

As described above, a large number of the light guide plates 18 are placed in a grid and in a planar layout within the area of the bottom plate 14a of the chassis 14. The layout of the light guide plates 18 will be explained in detail. First, the layout in the tandem-arrangement direction (the Y-axis direction) will be explained. As illustrated in FIG. 9, the light guide plates 18 are mounted such that the light guide portions 32 and the light exit portions 31 are separated from the LED boards 17. The light guide portion 32 and the light exit portion 31 of each light guide plate 18 overlap about entire areas of the board-mounting portion 30 and the light guide portion 32 of the adjacently located light guide plate 18 on the front side (the upper side in the vertical direction) from the front side. Namely, the board-mounting portion 30 and the light guide portion 32 of the light guide plate 18 on the front side overlap the light guide portion 32 and the light exit portion 31 of the light guide plate 18 on the rear side in the plan view. The board-mounting portion 30 and the light guide portion 32, which are the non-luminous portion of the light guide plate 18, are covered with the light guide portion 32 and the light exit portion 31 of the adjacent light guide plate 18. Namely, the board-mounting portion 30 and the light guide portion 32 are not bare on the diffuser 15b side and only the luminous portion, that is, the light exit surface 36 of the light exit portion 31 is bare. With this configuration, the light exit surfaces 36 of the light guide plates 18 are continuously arranged without gaps in the tandem-arrangement direction. About entire rear surfaces of the light guide portion 32 and the light exit portion 31 are covered with the reflection sheet 24. Therefore, even when light is reflected by the light entrance surface 34 and leak occurs, the leak light does not enter the adjacent light guide plate 18 on the rear side. The light guide portion 32 and the light exit portion 31 of the light guide plate 18 on the rear side (the front-surface side) is supported by the adjacent overlapping light guide plate 18 on the front side (the rear-surface side) from the chassis 14 side. The sloped surface 40 of the light guide plate 18 on the front-surface side and the sloped surface 39 on the rear-surface side have substantially same slope angles and are parallel to each other. Therefore, gaps are not created between the overlapping light guide plates 18 and the light guide plates 18 on the rear-surface side support the light guide plates 18 on the rear-surface side without rattling. Only front-side parts of the light guide portions 32 of the light guide plates 18 on the rear side cover the board-mounting portions 30 of the light guide plates 18 on the front side. The rear-side parts face the LED boards 17.

The layout in a direction perpendicular to the tandem-arrangement direction (the X-axis direction) is illustrated in FIGS. 5 and 11. The light guide plates 18 do not overlap each other in the plan view. They are arranged parallel to each other with predetermined gaps therebetween. With the gaps, air layers are provided between the light guide plates 18 adjacent to each other in the X-axis direction. Therefore, the rays of light do not travel or mix between the light guide plates 18 adjacent to each other in the X-axis direction and thus the light guide plates 18 are optically independent from each other. The size of the gaps between the light guide plates 18 is equal to or smaller than that of the slit 42.

As illustrated in FIGS. 3 and 11, a large number of the light guide plates 18 are arranged in the planar layout inside the chassis 14. The light exit surface of the backlight unit 12 is formed with a number of the divided light exit portions 31S (or the divided light exit surfaces 36S). As described above, the divided light guide portions 32s and the divided light exit portions 31S of the light guide plates 18 are optically independent from each other. Turning on and off of the LEDs 16 are controlled independently. The passing of light rays from the divided light exit portions 31S can be controlled independently. The driving of the backlight unit 12 can be controlled using an area active technology that provides control of outgoing light for each area. This significantly improves contrast that is very important for display performance of the liquid crystal display device 10.

As illustrated in FIG. 13, each LED 16 is arranged in the LED holding space 33 with entire peripheries thereof are separated from the inner walls of the LED holding space 33 (including the light entrance surface 34) by gaps in predetermined sizes. The gaps are provided for compensating for errors related to amounting position of the light guide plate 18 with respect to the LED board 17. The gaps are required for allowing thermal expansion of the light guide plate 18, which may occur due to heat generated during lighting of the LED 16. By providing the gaps between the LED 16 and the walls of the LED holding space 33, the light guide plate 18 is less likely to touch the LED 16 and thus the LED 16 is protected from being damaged. The gaps between the LEDs 16 and the light entrance surfaces 34 among the gaps described above will be indicated by symbol C (in FIG. 14).

Providing the gaps C between the LEDs 16 and the light entrance surfaces 34 may result in the following problem. Rays of light emitted from each LED 16 radiate around the light axis LA, as described above. Most of the rays directly enter the corresponding light entrance surface 34. Some of the rays travel toward outside the light entrance surface 34 because of the gap C. Namely, the rays do not directly enter light entrance surface 34 and the travel toward the LED board 17. The rays that strike the LED board 17 may be absorbed by the LED board 17. This may reduce efficiency in using the light emitted from the LED 16. Some of the rays that travel outside the light entrance surface 34 because of the gap C travel toward the opposite side from the LED board 17 (i.e., toward the front or the light-exiting side). Therefore, the efficiency in using the light that emitted from the LED 16 decreases. In both cases, amounts of incident light to the light entrance surface 34 and outgoing light from the light exit surface 36 decrease. As a result, the brightness of each light guide plate 18 may decrease and thus the overall brightness of the backlight unit 12 may decrease. The amount of the light that does not directly enter the light entrance surface 34 tends to increase as the size of the gap C (i.e., the distance between the light-emitting surface 16a of the LED 16 and the light entrance surface 34) increases.

Figure 14:
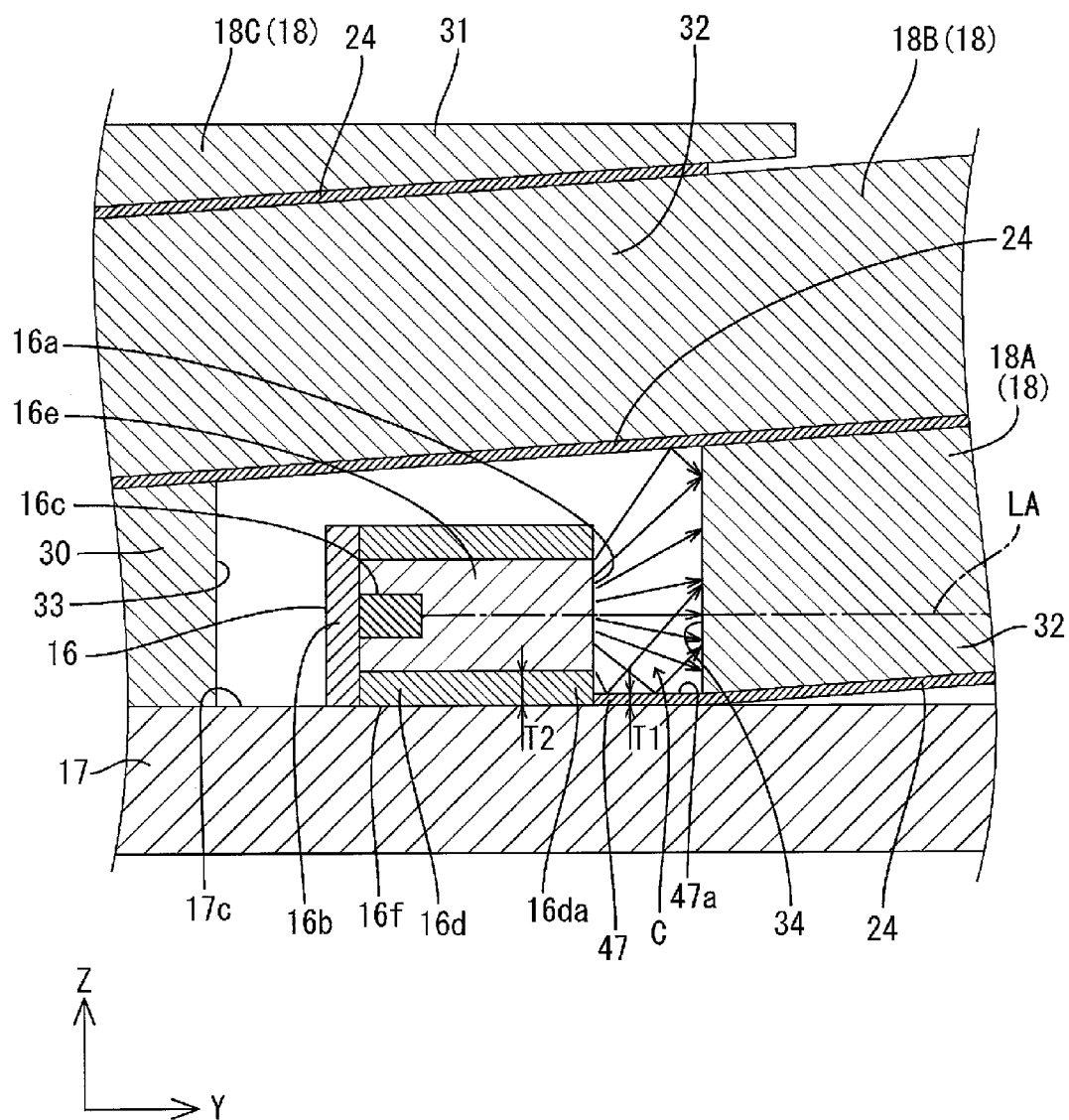
FIG. 14 is a magnified cross-sectional view of the light guide plate around an LED holding space.

In this embodiment, as illustrated in FIG. 14, each reflection sheet 24 attached to the corresponding light guide plate 18 has reflection parts 47 that project from the light entrance surface 34 toward the LED 16. Each reflection part 47 is disposed on the LED board 17 in the gap C between the LED 16 and the light entrance surface 34. The reflection parts 47 reflect the rays that travel toward the LED board 17 without directly entering the respective light entrance surfaces 34 after emitted from the LED 16. Namely, the rays indirectly enter the light entrance surfaces 34 after reflected by the reflection parts 47.

Specifically, as illustrated in FIG. 13, the rear end part of the reflection sheet 24 (i.e., the end part on the board-mounting portion 30 side (the LED 16 side)) has the following configuration. The rear-end part is formed so as to match the front edges of the flat surface 38 on the rear side of the board-mounting portion 30, the LED holding spaces 33 and the photo sensor holding space 45. Areas corresponding to the LED holding spaces 33 partially extend toward the rear (the LED 16 side) so as to project to the LED holding spaces 33. The projecting areas are the reflection parts 47. Each reflection part 47 has a width (a size that measures in the X-axis direction) substantially the same as that of the corresponding LED holding space 33 (see FIG. 13). A size of the projection (a size that measures in the Y-axis direction) which projects from the light entrance surface 34 is substantially the same as the gap C between the LED 16 and the light entrance surface 34 (see FIG. 14). The reflection parts 47 cover an entire area of the parts of the LED board 17 located in the gaps C between the LEDs 16 and the light entrance surfaces 34. As illustrated in FIG. 14, the rear edge surface of the reflection part 47 is substantially on the same plane with the light-emitting surface 15a of the LED 16. Namely, each reflection part 47 and each light-emitting surface 15a are designed so as to have little gap therebetween. An area of the reflection sheet 24 adjacent to the reflection parts 47 is sandwiched (or arranged) between the light guide plate 18 and the LED board 17. As a result, the light entrance surfaces 34 of the light guide plate 18 are away from the mounting surface 17c of the LED board 17 by the thickness of the reflection sheet 24.

Each reflection sheet 24 provide integrally with the reflection parts 47 is made of synthetic resin having insulation properties. It includes a plurality of layers of dielectrics having different refraction indexes. Namely, it has dielectric multilayer structure. "Dielectric multilayer structure" refers to a structure having dielectric multilayer (not shown) each having a thickness of a quarter of a wavelength of visible light and a refraction index different from another. For example, "ESR" manufactured by Sumitomo 3M limited may be used for the reflection sheets 24. Polyester-contained resin is used in the ESR as dielectric material. By using this type of material for the reflection sheets 24, the following effects can be achieved. Because conductive materials such as metal films are not included in the reflection sheets 24, currents do not leak when the LEDs 16 are lit. Therefore, the power consumption decreases. By providing the reflection sheets 24 in the dielectric multilayer structures, rays of light are reflected with high efficiency without diffused.

By providing the reflection sheets 24 in the dielectric multilayer structures, the thicknesses of the reflection sheets 24 (including the reflection parts 47) can be reduced. Therefore, each reflection part 47 can be provided with a thickness T1 (a thickness that measures from the mounting surface 17c of the LED board 17) smaller than a thickness T2 of the opening edge 16da of the housing 16d of the LED 16. The opening edge 16da defines the light-emitting surface 16a. The thickness of the opening edge 16da of the housing 16d is about 200 μm and the thickness of the reflecting portion 47 is about 65 μm. A surface of the reflection part 47 on the front, that is, a reflection surface 47a that faces the light-emitting surface 16a or the light entrance surface 34 is located lower than the inner opening edge 16da of the housing 16d (i.e., a boundary with the light-emitting surface 16a). Namely, the reflection surface 47a is closer to the LED board 17. Therefore, a long path of light from the light-emitting surface 16a of the LED 16 to a part of the reflecting portion 47 where the light strike is secured. The part (a reflecting point) can be set closer to the light entrance surface 34. Furthermore, the thickness of each reflection sheet 24 is reduced. Therefore, the distance between the mounting surface 17c of the LED board 17 and the light entrance surface 34 that is lifted because the reflection sheet 24 is sandwiched between the light guide plate 18 and the LED board 17 is maintained as small as possible. The distance (the size of the gap C measuring in the Y-axis direction) between the LED 16 and the light entrance surface 34 is a few millimeters.

Each LED holding space 33 of each light guide plate 18 for holding the corresponding LED 16 runs all the way through the light guide plate 18 in the thickness direction. Therefore, each gap C between the corresponding LED 16 and light entrance surface 34 opens on the front side. If the gap C between the LED 16 and the light entrance surface 34 is provided adjacently to the diffuser 15b, some rays of light leak to the front side through the gap C between the LED 16 and the light entrance surface 34. As a result, the amount of incident light to the light entrance surface 34 and the amount of outgoing light from the light exit surface 36 decrease, and thus the brightness on the light guide plate 18 decreases. If the leak light directly enters the diffuser 15b, the brightness on the diffuser 15b may differ from the brightness on the light exit surface 36 of the light guide plate 18. This may cause unevenness in the overall brightness of the backlight unit 12.

In this embodiment, the LED holding spaces 33 of each light guide plate 18 (the first light guide plate 18A) are covered by the reflection sheet 24 attached to the adjacent light guide plate 18 (the second light guide plate 18B), which is placed on the front-surface side and the rear side. In FIG. 14, the light guide plate with the LED holding space 33 is referred to as the first light guide plate 18A, and the light guide plate arranged on the rear side and on the front-surface side with respect to the first light guide plate 18A is referred to as the second light guide plate 18B. The light guide plate arranged on the rear side and on the front-surface side with respect to the second light guide plate 18B is referred to as the third light guide plate 18C. To refer to the light guide plates 18 as a whole, the numeral 18 without the letters is used.

The light guide portion 32 and the light exit portion 31 of the second light guide plate 18B are placed on the front-surface side of the board-mounting portion 30 and the light guide portion 32 of the first light guide plate 18A. They overlap each other in a plan view. A part of the reflection sheet 24 attached to the rear of the light guide portion 32 of the second light guide plate 18B covers the board-mounting portion 30 from the front-surface side and entirely the LED holding spaces 33 provided in the board-mounting portion 30 (see FIG. 11). The LED holding spaces 33 of the first light guide plate 18A are collectively covered by the reflection sheet 24 of the second light guide plate 18B between the board-mounting portion 30 of the first guide plate 18A and the light guide portion 32 of the second light guide plate 18B. Light may leak from the LED holding space 33 via gaps including the gap C between the light entrance surface 34 and the LED 16 to the front-surface side. Even in such a case, the light is reflected by the reflection sheet 24 of the second light guide plate 18B, and the light travels back to the LED holding space 33. The light indirectly enters the first light guide plate 18A through the light entrance surface 34 and thus the light use efficiency can be further improved by this configuration together with the reflection part 47. Furthermore, the light exit portion 31 of the third light guide plate 18C on the rear side with respect to the second light guide plate 18B is placed on the front-surface side of the overlapping portion of the light guide portion 32 of the second light guide plate 18B with the LED holding spaces 33 of the first light guide plate 18A. The reflection sheet 24 attached to the third light guide plate 18C is arranged on the overlapping portion so as to overlap each other in a plan view.

Each light guide plate 18 having the above configuration is mounted to the LED board 17 on which the LEDs 16 are surface-mounted in the manufacturing process of the backlight unit 12. The LED boards 17 are mounted to predefined locations of the bottom plate 14a of the chassis 14 (see FIG. 3). Then, the light guide plates 18 are mounted to locations corresponding to the respective LEDs 16 on the LED boards 17. One of the light guide plates 18 is mounted at a location corresponding to the LEDs 16 located closest to the upper vertical end (or the front end) of the bottom plate 14a of the chassis 14 (or the top of the tandem layout or the top in the Y-axis direction). The rest of the light guide plates 18 are mounted in sequence at locations corresponding to the LEDs 16 one below the first one in the vertical direction (or the rear), and then the second one and so on (see FIGS. 7 to 9). The second light guide plate 18 and later ones in the mounting sequence are arranged so as to partially overlap the ones that arranged immediately above in the vertical direction (or the ones that in front). As a result, the light guide plates 18 are arranged in layers and in the tandem layout along the vertical direction.

When the light guide plates 18 are mounted to the LED boards 17, the positioning pins 35 of the light guide plate 18 are aligned with the respective positioning holes 17b of the LED board 17. Then, the positioning pins 35 are inserted in the positioning holes 17b. Each light guide plate 18 is positioned relative to the corresponding LED board 17 with respect to the X-axis direction and the Y-axis direction. The reflection parts 47 of the reflection sheet 24 provided integrally with the light guide plate 18 are also positioned relative to the LEDs 16 with respect to the X-axis direction and the Y-axis direction. Therefore, the rear-edge surfaces of the reflection parts 47 are precisely positioned relative to the light-emitting surfaces 16a of the LEDs 16 such that they are substantially on the same plane. As a result, gaps that separate the rear-edge surface of the reflection parts 47 from the light-emitting surfaces 16a of the LEDs 16 in the Y-axis direction between are not produced.

After all light guide plates 18 are mounted to the LED boards 17, other parts and the LED boards 17 with the light guide plates 18 are assembled into the backlight unit 12 and then to the liquid crystal display device (see FIGS. 4 to 9). When the liquid crystal display device 10 is turned on and the LEDs 16 are lit, light emitted from each LED 16 through the light-emitting surface 16a enters the light entrance surface 34. The light that enters the light guide plate 18 through the light entrance surface 34 travels through the light guide portion 32 toward the light exit portion 31 while totally reflects off the interface between the light guide plate 18 and the air layer. Therefore, the light does not leak to the external space while traveling through the light guide portion 32. During the travel of the light through the light guide portion 32, RGB rays of light emitted from the respective LED chips 16c of each LED 16 are mixed together into white light and the light is diffused such that sufficient rays of the light travel in the X-axis direction and the Y-axis direction. The rays that reach the light exit portion 31 are scattered by the scattering surface 37 formed on the opposite surface form the light exit surface 36 and reflected by the reflection sheet 24 disposed on the rear surface. Namely, the rays of light are guided upward so as to travel toward the light exit surface 36. The rays of light scattered by the scattering surface 37 and guided upward toward the light exit surface 36 include rays that strike the light exit surface 36 at angles smaller than the critical angle. Those rays exit the light guide plate 18 to the external space through the light exit surface 36. Rays that strike the light exit surface 36 at angles larger than the critical angle are totally reflected by the light exit surface 36 and then scattered by the scattering surface 37. The reflection and the scattering repeatedly occur. Then, the rays finally exit the light guide plate 18 through the light exit surface 36. The rays of light exit each light guide plate 18 are evenly scattered within the overall plane of the light exit surfaces 36 in the backlight unit 12. As a result, the liquid crystal panel 11 is illuminated with light that is substantially planar.

As illustrated in FIG. 14, rays of light emitted from each LED 16 travel radially around the light axis LA and most of them directly enter the light entrance surface 34. Because the gap C in a predefined size is provided between the LED 16 and the corresponding light entrance surface 34, some of the rays travel toward outside the light entrance surface 34 and do not directly enter the light entrance surface 34. In this embodiment, the reflection part 47, which is a part of the reflection sheet 24, is disposed on the LED board 17 in the gap C between the LED 16 and the light entrance surface 34. The rays that travel from the LED 16 toward the LED board 17 are reflected by the reflection part 47. Namely, the rays indirectly enter the light entrance surface 34. With this configuration, the efficiency in using the light emitted from the LED 16 improves. Because the reflection part 47 (or the reflection sheet 24) is made of insulating material, a current is less likely to leak when the LED 16 is lit and thus the low power consumption is achieved. Furthermore, the reflection part 47 has the dielectric multilayer structure that provides high light reflecting efficiency. Therefore, it reflects most of the light from the LED 16 toward the light entrance surface 34 without absorption. As a result, the light use efficiency greatly improves. Because the reflection part 47 has the dielectric multilayer structure, the thickness thereof is easily made thinner. Therefore, the reflection surface 47a that is bare and located on the LED 16 side, or light entrance surface 34 side, can be positioned as close as possible to the LED board 17. With this configuration, a long light path to the reflection part 47 in which the light emitted from the LED 16 through the light-emitting surface 16a travels can be provided. Moreover, a point at which the light strikes the reflection surface 47a (a reflection point) can be set closer to the light entrance surface 34 and thus the light effectively enters the light entrance surface 34. Because the reflection part 47 and the reflection sheet 24 are thin, the light entrance surface 34 is only slightly shifted in the Z-axis direction with respect to the LED 16 by the reflection sheet 24 arranged between the light guide plate 18 and the LED board 17. The presence of the reflection sheet 24 produces only a minor optical influence. Therefore, the LED 16 and the light guide plate 18 can be used without any modification, which contributes to cost reduction.

Rays of light that exit from each LED 16 and spread on the opposite side from the LED board 17, that is, on the front-surface side are reflected by the reflection sheet 24 attached to the second light guide plate 18B arranged on the rear side with respect to the first guide plate 18A that is provided for the LED 16. Therefore, the light is less likely to leak from the gap C between the LED 16 and the light entrance surface 34. The LED holding space 33 of the first light guide plate 18A is entirely covered by the reflection sheet 24 of the second light guide plate 18B that is arranged on the front-surface side (the opposite side from the LED board 17) so as to overlay the first light guide plate 18A. The rays that spread on the front-surface side through the gap C between the LED 16 and the light entrance surface 34 are reflected by the reflection sheet 24 so as to indirectly enter the light entrance surface 34. With this configuration, the efficiency in using the light emitted from the LED 16 improves. The LED holding space 33 of the first light guide plate 18A is entirely covered by the reflection sheet 24 of the second light guide plate 18B. Therefore, the light that travels toward the outside of the LED holding space 33 via the gap C is totally reflected by the reflection sheet 24 and thus the light use efficiency further improves.

The light emitted from each LED 16 efficiently enters the light entrance surface 34 as described above. The sufficient amounts of incident light to the light entrance surface 34 and outgoing light from the light exit surface 36 are achieved. Therefore, high brightness can be achieved on the light guide plate 18. As a result, the overall brightness of the backlight unit 12 improves and thus the liquid crystal display device 10 having high display quality can be provided.

As described above, the backlight unit 12 of this embodiment includes the LEDs 16, the light guide plates 18, the reflection sheets 24, the LED boards 17 and the reflection parts 47. Each light guide plate 18 has the light entrance surfaces 34 and the light exit surface 36. Each light entrance surface 34 is arranged so as to face the corresponding LED 16 with the gap C therebetween. Light emitted from the LED 16 enters the light entrance surface 34. The light exit surface 36 is arranged parallel to the arrangement direction in which the LED 16 and the light entrance surface 34 are arranged. The light exits from the light exit surface 36. The reflection sheet 24 is arranged on the opposite side of the light guide plate 18 from the light exit surface 36. The reflection sheet 24 reflects the light toward the light exit surface 36. The LED board 17 is arranged so as to face the reflection sheet 24. The LED 16 and the light guide plate 18 are mounted to the LED board 17. The reflection part 47 is disposed on the LED board 17 at least in the area between the LED 16 and the light entrance surface 34. The reflection part 47 reflects the light toward the light entrance surface 34.

The light emitted from the LED 16 includes rays that directly enter the light entrance surface 34 and rays that travel toward the LED board 17. The rays that travel toward the LED board 17 are reflected by the reflection part 47 disposed on the LED board 17 between the LED 16 and the light entrance surface 34 toward the light entrance surface 34. Then, the rays enter the light entrance surface 34. The light is less likely to be absorbed by the LED board 17 in comparison to the known devices. Therefore, the efficiency in using the light emitted from the LED 16 improves and high brightness can be achieved. Furthermore, the gap C provided between the LED 16 and the light entrance surface 34 allows the thermal expansion of the light guide plate 18 within the space of the gap C. Moreover, the gap C can compensate for the error that may occur during the mounting of the light guide plate 18 to the LED board 17. Therefore, the light guide plate 18 is less likely to interfere with the LED 16.

Each reflection part 47 is made of insulating material. If the reflection part 47 is made of conductive material such as a metal film, a current may leak while the LED 16 is lit. Because the reflection part 47 is made of insulating material, such a current is less likely to leak. As a result, the power consumption decreases.

Each reflection portion 47 includes a number of dielectric layers having different refraction indexes. By preparing the reflection part 47 in a "dielectric multilayer structure," the reflection part 47 can deliver highly efficient reflection performance without diffusion. Furthermore, the thickness of the reflection part 47 can be reduced. This contributes to reduction in the overall thicknesses of the backlight unit 12 and the liquid crystal display device 10. The "dielectric multilayer structure" is a structure in which a number of dielectrics having thickness equal to a quarter of a wavelength of visible light and different refraction indexes are layered. An example is "ESR" manufactured by Sumitomo 3M. Polyester-contained resin is used in the ESR as dielectric material.

The LEDs 16 are used as light sources. Therefore, high brightness can be achieved. Furthermore, the LED boards 17 on which the LEDs 16 are mounted are used as base members. By mounting the light guide plates 18 to the LED boards 17 on which the LEDs 16 are mounted, the positional relationships between the LEDs 16 and the light guide boards 18 are stably maintained.

Each LED 16 has the light-emitting surface 16 through which light exits and a mounting surface 16f that is attached to the LED board 17. The light-emitting surface 16 and the mounting surface 16f are provided adjacent to each other. This configuration is suitable for a device including side-emitting LEDs such as the LEDs 16 each having the light-emitting surface 16a and the mounting surface 16f adjacent to each other. When the LEDs 16 are used, the mounting surfaces 17c of the LED boards 17 on which the LEDs 16 are mounted are parallel to the light exit surfaces 36 of the light guide plate 18. This configuration is easily applied to large-size devices.

Each LED 16 includes the housing 16d having a drum-like shape with an opening on the light-emitting surface 16a side and the mounting surface 16. Each reflection part 47 is formed such that the thickness that measures from the mounting surface 17c of the LED board 17 on which the LED 16 is mounted is smaller than that of the opening edge 16da of the housing 16. With this configuration, the reflection part 47 is less likely to interfere with the light that exits from the light-emitting surface 16a defined by the opening edge 16da of the housing 16. Moreover, the reflection surface 47a of the reflection part 47 is located closer to the mounting surface 17c of the LED board 17 than the light-emitting surface 16a. Therefore, the long light path to the reflection part 47 in which the light emitted from the LED 16 through the light-emitting surface 16a travels can be provided, and the light reflected by the reflection part 47 effectively enters the light entrance surface 34.

Lines of the LEDs 16 and the light guide plates 18 are arranged parallel to each other. With this configuration, high brightness can be achieved on the light guide plates 18 using the reflection parts 47 and the brightness on the light guide plates 18 is leveled. Therefore, the high overall brightness can be achieved on the backlight unit 12 and uneven brightness is less likely to occur.

The LEDs 16 and the light guide plates 18 are arranged in lines that are along the arrangement direction and parallel to each other. The light guide plates 18 are arranged such that the adjacent light guide plates 18 are partially overlap each other in a direction perpendicular to the light exit surfaces 36. The light guide plates 18 include the first light guide plate 18A and the second light guide plate 18B. The first light guide plate 18A is arranged closer to the LED board 17 than the second light guide plate 18B. The second light guide plate 18B is arranged farther from the LED board 17 relative to the first light guide plate 18A. The reflection sheet 24 is arranged on the second light guide plate 18B so as to cover the gap C between the light entrance surface 34 of the first light guide plate 18A and the LED 16. Some rays of light from the LED 16 that faces the light entrance surface 34 of the first light guide plate 18A travel in an opposite direction from the LED board 17. The rays are reflected by the reflection sheet 24 of the second light guide plate 18B that covers the gap C between the light entrance surface 34 and the LED 16. Then, the rays enter the light entrance surface 34 of the first light guide plate 18A. With this configuration, the light use efficiency further improves.

The first light guide plate 18A has the LED holding spaces 33 that are through holes and provided for holding the LEDs 16. The reflection sheet 24 attached to the second light guide plate 18B is disposed so as to cover the LED holding spaces 33. With this configuration, the rays emitted from the LEDs 16 that face the respective light entrance surfaces 34 of the first light guide plate 18A are properly reflected by the reflection sheet 24 of the second light guide plate 18B. Therefore, the light use efficiency further improves.

The LEDs 16 and the light guide plates 18 are two-dimensionally arranged in a parallel layout. The light exit surfaces 36 of the light guide plates 18 are also two-dimensionally arranged in a parallel layout. Therefore, the overall brightness of the backlight unit 12 further improves and uneven brightness is less likely to occur.

Each reflection part 47 is provided integrally with the corresponding reflection sheet 24. With this configuration, a gap that separates the light guide plate 18 from the reflection part 47 in the arrangement direction in which the LED 16 and the light entrance surface 34 are arranged is less likely to be produced around the light entrance surface 34. With this configuration, the light use efficiency further improves.

The light guide plates 18 and the LED boards 17 have the positioning pins 35 and the positioning holes 17b, respectively. They are the positioning structures provided for positioning the light guide plates 18 relative to the respective LED boards 17 with respect to the arrangement direction. With this configuration, the light guide plates 18 are positioned relative to the LED boards 17 with respect to the arrangement direction in which the LEDs 16 and the light entrance surfaces 34 are arranged. Moreover, the reflection parts 47 are also positioned relative to the LEDs 16 with respect to the arrangement direction. Therefore, unnecessary gaps are less likely to be produced between the LEDs 16 and the reflection parts 47 in the arrangement direction. As a result, the light use efficiency further improves.

Second Embodiment

The second embodiment of the present invention will be explained with reference to FIGS. 15 and 16. In this embodiment, the shapes of each light exit surface 36 of the first embodiment are altered. The same components as the first embodiment will be indicated with the same symbols. The same configuration, functions and effects will not be explained.

Figure 15:
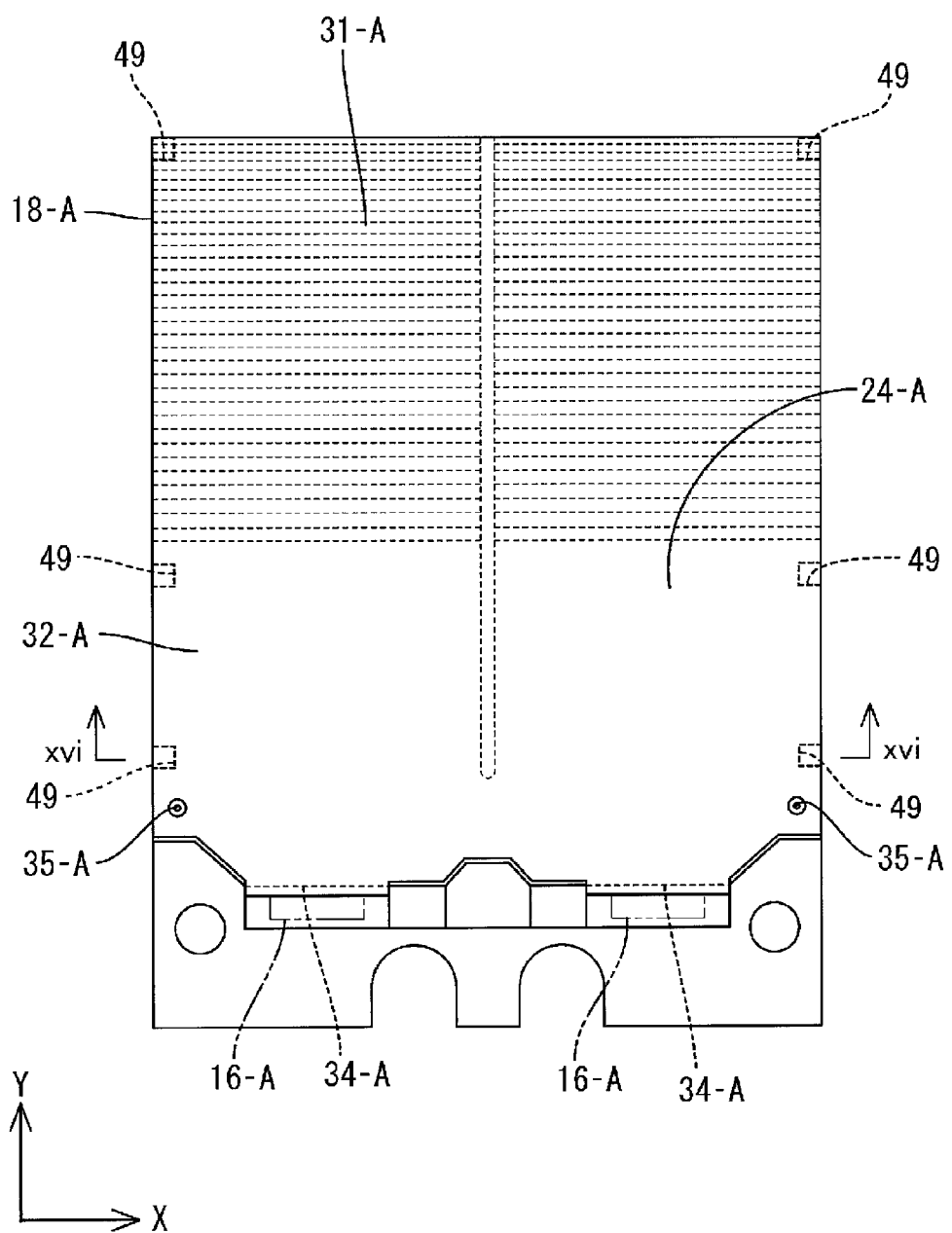
FIG. 15 is a bottom view of a light guide plate according to the second embodiment of the present invention.
Figure 16:
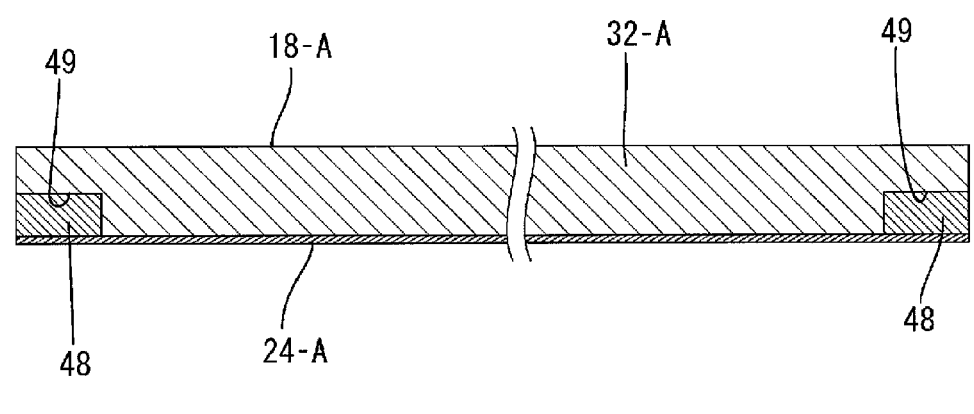
FIG. 16 is a cross-sectional view of the light guide plate in FIG. 15 along line xvi-xvi.

As illustrated in FIGS. 15 and 16, adhesive recesses 49 are provided in a rear surface of each light guide plate 18-A, that is, a bonding surface to which a corresponding reflection sheet 24-A is bonded. The adhesive recesses 49 are filled with adhesives 48 for bonding the reflection sheet 24-A to the light guide plate 18-A. Six adhesive recesses 49 are formed in each light guide plate 18-A. Three of them are formed close to either end of a dimension along the X-axis direction so as to be separated from each other in the Y-axis direction. The X-axis direction corresponds to the direction perpendicular to the arrangement direction in which the LEDs 16-A and the light entrance surfaces 34-A are arranged and parallel to the light entrance surfaces. Each adhesive recess 49 has an opening on the reflection sheet 24-A side and a lateral opening. The adhesive recesses 49 are filled with the adhesives 48 and the reflection sheet 24-A is attached to the rear surface of the light guide plate 18-A. As a result, the reflection sheet 24-A is fixed to the light guide plate 18-A and held in a condition that it is mounted. The front surface of the reflection sheet 24-A and the rear surface of the light guide plate 18-A, which face each other, can be bonded together without a gap in a size equal to the thickness of the adhesive 48. The adhesive recesses 49 are formed in areas close to the front end of each light guide plate 18-A (an area farthest from the LED 16-A in the light exit portion), close to the front edge of the light guide portion 32 and immediately in front of the positioning pin 35-A in the light guide portion 32-A.

In this embodiment, the adhesives 48 are provided between each light guide plate 18A and the corresponding reflection sheet 24-A for bonding them together. The light guide plate 18-A has the adhesive recesses 49 having an opening on the reflection sheet 24-A side. The adhesive recesses 49 are filled with the adhesives 49. With the adhesives 48 in the adhesive recesses 49, the light guide plate 18-A and the reflection sheet 24-A are bonded together without any gaps therebetween. Therefore, light travels through the light guide plate 18-A efficiently exits from the light exit surface 34-A, and the brightness improves.

A pair of the adhesives 48 is provided on each light guide plate 18-A. The adhesives 48 are placed in locations close to respective ends of the dimension perpendicular to the arrangement direction and parallel to the light exit surface. With this configuration, the adhesives are least likely to be an optical obstacle in the light guide plate 18-A. Moreover, the reflection sheet 24 provided integrally with the light guide plate 18-A is stably held to the light guide plate 18-A with the pair of adhesives 48.

Third Embodiment

Next, the third embodiment of the present invention will be explained with reference to FIG. 17. In this embodiment, reflection parts 47-B and LEDs 16-B having different configurations are used. Components similar to the first embodiment will be indicated with the same symbols followed by -B. The same configuration, functions and effects will not be explained.

Figure 17:
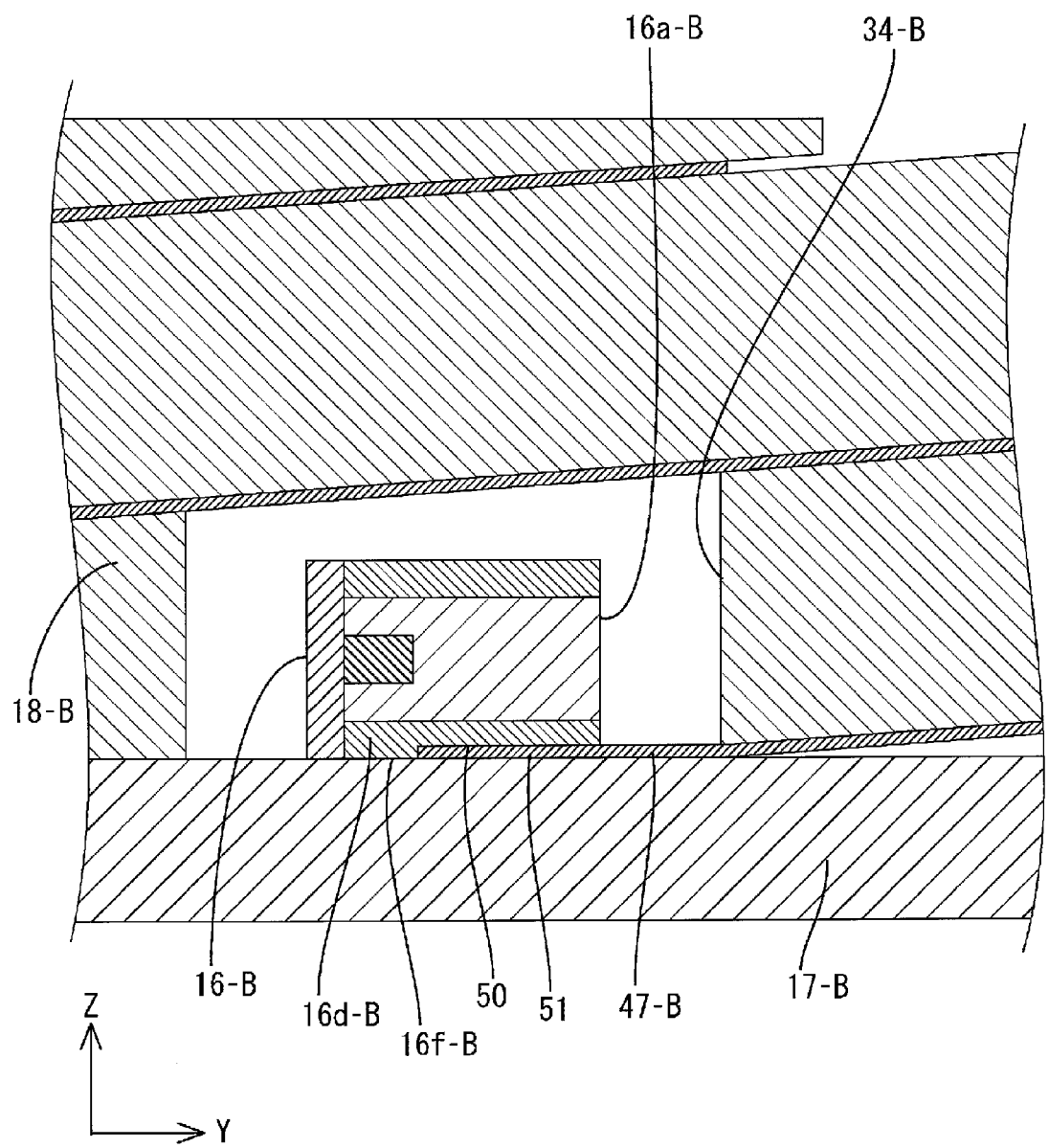
FIG. 17 is a magnified cross-sectional view of a light guide plate around an LED holding space according to the third embodiment of the present invention.

As illustrated in FIG. 17, each LED 16-B includes a housing 16d-B having a receiving hole 50. The receiving hole 50 has an opening on the front. Each reflection part 47-B has an extending portion 51 that extends toward the rear (away from a light entrance surface 34-B). The extending portion 51 is inserted in the receiving hole 50. Specifically, the receiving hole 50 has openings on the front and the rear-surface side (the LED board 17-B side), respectively. Namely, the receiving hole 50 is formed by cutting a part of a mounting surface 16f-B of the housing 16d-B. The mounting surface 16f-B is attached to the LED board 17-B. The extending portion 51 projects from the rear edge of the reflection part 47-B, that is, from the light-emitting surface 16*a*-B of the LED 16-B. The thickness and the length of the extension to the rear are substantially equal to or smaller than the dimensions of the receiving hole 50 corresponding thereto.

To mount the light guide plate 18-B to the LED board 17-B, the extending portion 51 is inserted in the receiving hole 50. The light guide plate 18-B is positioned relative to the LED board 17-B with positioning pins and fixed with clips in the same manner as the first embodiment. An error may occur, for example, the light guide plate 18-B may be mounted at a location more to the front than a predefined location. Because the extending portion 51 having the length larger than the error, the rear-edge surface of the extending portion 51 is properly positioned more to the rear than the light-emitting surface 16*a*-B of the LED 16-B. Therefore, the LED board 17-B is not positioned immediately below the light-emitting surface 16*a*-B of the LED 16-B. Namely, light emitted from the LED 16-B is properly reflected by the reflection part 47-B (including the extending portion 51).

In this embodiment, each housing 16*d*-B has the receiving hole 50 having the opening on the light entrance surface 34-B side. Each reflection part 47-B has the extending portion 51 that is inserted in the receiving hole 50. By inserting the extending portion 51 of the reflection part 47-B in the receiving hole 50, a gap that separates the housing 16*d*-B from the reflection part 47-B in the arrangement direction in which the LED 16-B and the light entrance surface 34-B are arranged is less likely to be produced around the light-emitting surface 16*a*-B. As a result, the light use efficiency further improves.

Fourth Embodiment

The fourth embodiment of the present invention will be explained with reference to FIGS. 18 and 19. In this embodiment, reflection parts 47-C are provided separately from reflection sheets 24-C. Components similar to the first embodiment will be indicated with the same symbols followed by -C. The same configuration, functions and effects will not be explained.

Figure 18:
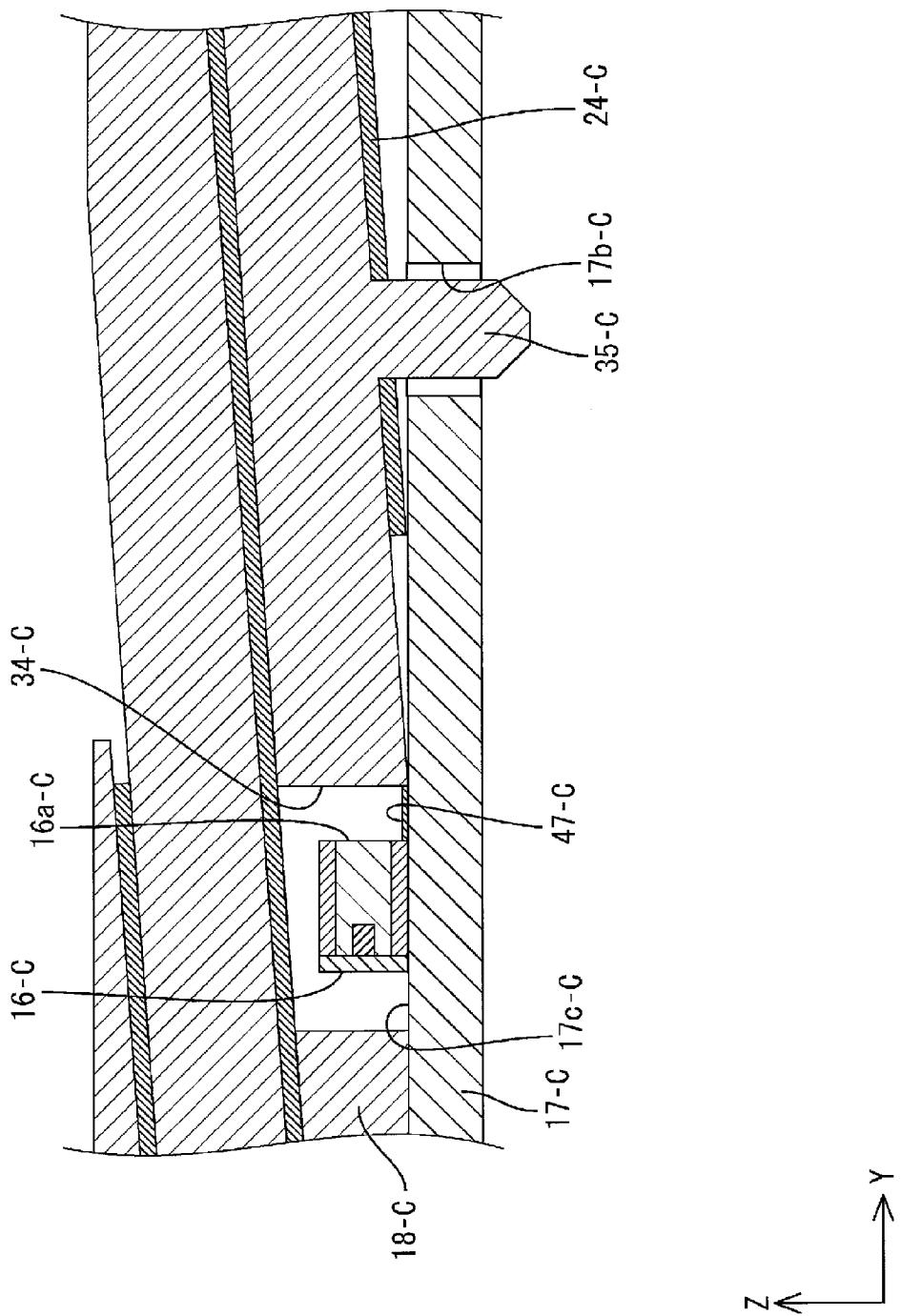
FIG. 18 is a magnified cross-sectional view of a light guide plate around an LED holding space according to the fourth embodiment of the present invention.

As illustrated in FIG. 18, the reflection parts 47-C are provided separately from the respective reflection sheets 24-C. They are bonded to the respective LED boards 17-C. Specifically, each reflection part 47-C is arranged between LEDs 16-C and light entrance surfaces 34-C of a corresponding light guide plate 18-C on a mounting surface 17*c*-C of the corresponding LED board 17-C. Each reflection part 47-C has a dielectric multilayer structure such as "ESR."

The reflection sheets 24-C are made of different material from the material of the reflection parts 47-C and relatively less expensive. Specifically, the reflection sheets 24-C are made of insulating resin material having white surfaces such as polycarbonate. The reflection efficiency of the reflection sheets 24-C made of such material is relatively low in comparison to the reflection parts 47-C. The thicknesses of the reflection sheets 24-C are relatively large, for example, about 200 μm. However, the cost is relatively low. The amount of material used for the reflection sheets 24-C is relatively larger than that of the reflection parts 47-C. By using less expensive material for the reflection sheets 24-C, the overall production costs of the backlight unit and the liquid crystal device can be reduced.

Figure 19:
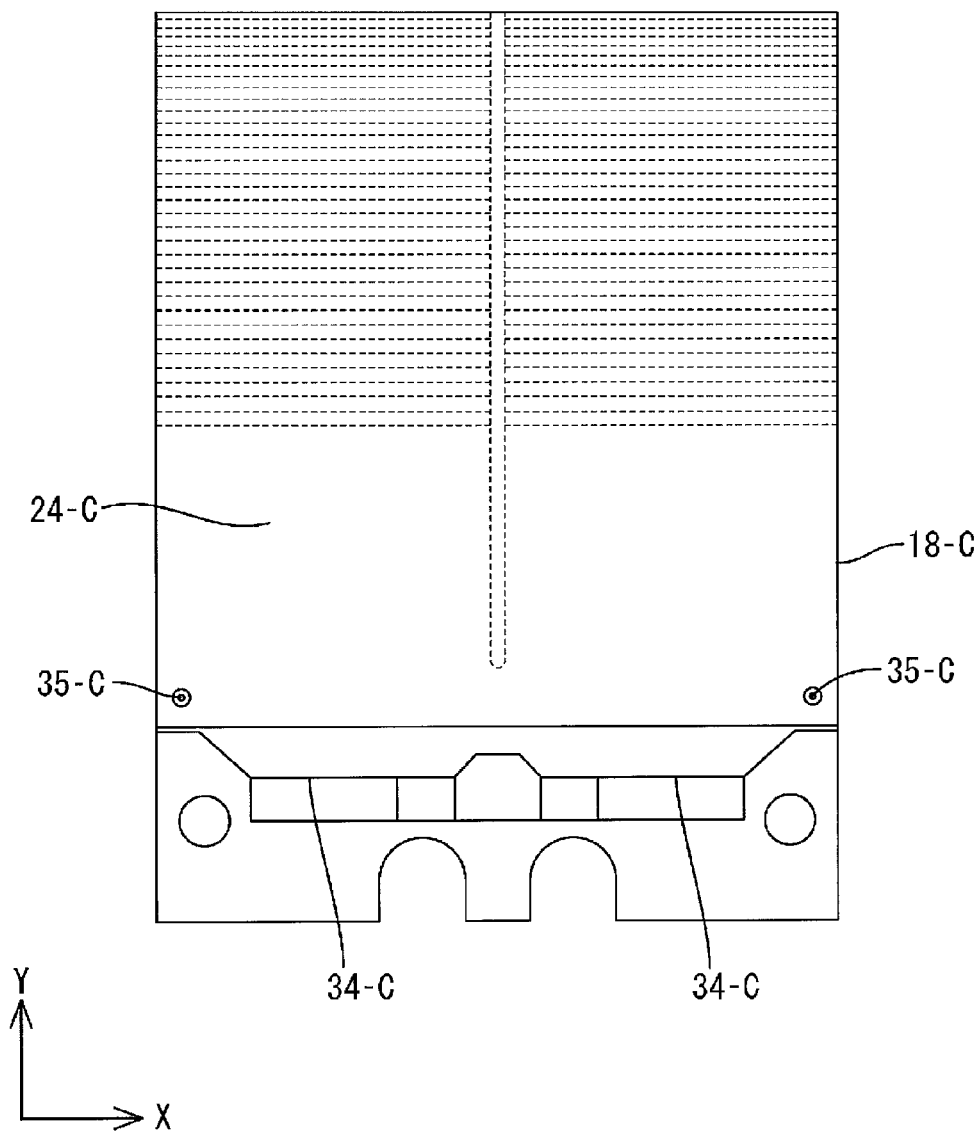
FIG. 19 is a bottom view of the light guide plate.

As illustrated in FIGS. 18 and 19, each reflection sheet 24-C has a substantially flat rear-edge surface along the X-axis direction. The rear-edge surface is located more to the front than light entrance surfaces 34-C. The reflection sheet 24-C does not have a portion that is arranged between the light guide plate 18-C and the LED board 17-C unlike the first embodiment, and a part of the light guide plate 18-C around the light entrance surface 34-C is placed directly on a LED board 17-C. Relative positions of the light entrance surfaces 34-C to the light-emitting surfaces 16*a*-C of the respective LEDs 16-C in the Z-axis direction are stably fixed. When the light guide plate 18-C is mounted to the LED board 17-C, the light guide plate 18-C is positioned relative to the LED board 17-C in the X-axis and Y-axis directions by inserting positioning pins 35-C in positioning holes 17*b* of the LED board 17-C. Moreover, the light entrance surfaces 34-C are positioned relative to a front-edge surface of the reflection part 47-C in the X-axis and the Y-axis directions. Therefore, gaps that separate the light entrance surfaces 34-C from the reflection part 47-C in the Y-axis direction are less likely to be produced.

In this embodiment, each reflection part 47-C is provided separately from the corresponding reflection sheet 24-C. In the first embodiment, each reflection part 47 is provided integrally with the corresponding reflection sheet 24. Therefore, the reflection sheet 24 is arranged between the light guide plate 18 and the LED board 17 (see FIG. 14). When the reflection part 47-C separately provided from the reflection sheet 24-C as in this embodiment, the reflection sheet 24-C is not arranged between the light guide plate 18-C and the LED board 17-C. Therefore, relative positions of the light entrance surfaces 34-C of the light guide plate 18-C to the respective LEDs 16-C are stably fixed. As a result, light enters the light entrance surface 34-C with stable light entrance efficiency. Furthermore, a material can be flexibly chosen for the reflection parts 47-C.

Each reflection part 47-C is made of a material having higher reflection efficiency than the reflection sheets 24-C. The material having higher reflection efficiency is relatively more expensive than a material having lower reflection efficiency. By using such an expensive material only for the reflection parts 47-C, the cost can be reduced.

Each reflection part 47-C is provided integrally with the corresponding LED board 17-C. Therefore, the relative positions of the LEDs 16-C to the reflection part 47-C can be stabilized, and light emitted from each LED 16-C toward the LED board 17-C is properly reflected by the reflection part 47-C. Moreover, this configuration makes assembly work easier.

Each light guide plate 18-C and each LED board 17-C have the positioning pins 35-C and the positioning holes 17*b*-C, respectively. The positioning pins 35-C and the positioning holes 17*b*-C are the positioning structures provided for positioning the light guide plates 18-C relative to the respective LED boards 17-C in the arrangement direction that is described earlier. The light guide plates 18-C are positioned relative to the respective LED boards 17-C in the arrangement direction in which the LEDs 16-C and the respective light entrance surfaces 34-C are arranged. Moreover, the light entrance surfaces 34-C are positioned relative to the respective reflection parts 47-C in the arrangement direction. Therefore, unnecessary gaps that separate the light entrance surfaces 34-C from the reflection parts 47-C in the arrangement direction are less likely to be produced. As a result, the light use efficiency further improves.

Other Embodiments

The present invention is not limited to the above embodiments explained in the above description. The following embodiments may be included in the technical scope of the present invention, for example.

(1) A modification of the fourth embodiment is illustrated in FIG. 20. Reflection parts 47-C' are provided separately from reflection sheets 24-C' and arranged so as to entirely surround the respective LEDs 16-C'. With this configuration, the light use efficiency further improves.

(2) In the above embodiments, the thickness of each reflection part is smaller than that of the opening edge of each housing. However, the thickness of the reflection part may be set substantially equal to the thickness of the opening edge of the housing. The thickness of the reflection part may be larger than that of the opening edge of the housing.

(3) In the first to the third embodiments, the materials having the dielectric multilayer structures such as "ESR" are used for the reflection sheets (including the reflection parts). However, insulating materials having structures other than the dielectric multilayer structures may be used. Furthermore, different material can be used for the reflection parts of the fourth embodiment.

(4) In the above embodiments, the insulating resins are used for the reflection sheets and the reflection parts. However, the reflection sheets and the reflection parts may contain conductive materials such as metal films.

(5) In the second embodiment, the locations, the number and the size of the adhesive recesses and the adhesives in the light guide plates can be altered as necessary. For example, the adhesive recesses and the adhesives may be arranged in the middle areas of the light guide plates.

(6) The shapes of the receiving holes in the third embodiment may be altered as necessary. For example, each receiving hole may run all the way through the housing from front to rear, or may have an opening only on the front side and no opening on the LED board side.

(7) The reflection parts and the reflection sheets provided separately in the fourth embodiment can be made of the same material. With the reflection parts and the reflection sheets made of less expensive material, the cost can be further reduced. If the reflection parts and the reflection sheets are made of material having a dielectric multilayer structure such as "ESR," the light use efficiency can be further improved because the reflection efficiency thereof is high. Moreover, the thickness can be reduced.

(8) The LEDs may be configured differently from the above embodiments.

(9) In the above embodiments, each LED holding hole runs all the way through the light guide plate in the thickness direction. However, the LED holding hole may have an opening on the rear side. Even in this case, the LED holding hole can be still covered entirely by the reflection sheet of the second light guide plate on the front-surface side.

(10) In the above embodiments, the light guide plates have the positioning pins and the LED board have the positioning holes, respectively, as the positioning structures for positioning the light guide plates relative to the respective LED boards. However, positioning pins and positioning holes may be provided the other way around. Namely, the LED boards may have positioning pins and the light guide plates have positioning holes. The positioning structures can be altered as necessary. The light guide plates and the LED boards may not have the positioning structures.

(11) In the above embodiment, each light guide plate has a single slit. However, each light guide plate may have two or more slits. With such a configuration, a single light guide plates can collectively cover three or more LEDs. This makes assembly of the backlight unit easier. Fixing points where the light guide plate are fixed with the fixing members such as clips should be set such that the LEDs are located between the fixing points.

(12) In the above embodiments, each light guide plate has the slit that divides the light exit portion and the light guide portion so that a single light guide plate covers a plurality of the LEDs. However, each light guide plate may not have the slit and only covers a corresponding LED (i.e., may have a single light entrance surface). With this configuration, light from the adjacent LED that is not an object to be covered by a specific light guide plate is less likely to enter the specific light guide plate. As a result, each light guide plate can maintain optical independence from another. Fixing points where the light guide plate are fixed with the fixing members such as clips should be set such that the LEDs are located between the fixing points.

(13) In the above embodiment, each light guide plate has a rectangular shape in a plan view. However, each light guide plate may have a square shape in a plan view. The lengths, the widths, the thicknesses and the outer surface shapes of each board-mounting portion, each light guide portion and each light exit portion can be altered as necessary.

(14) In the above embodiment, each LED emits light upward in the vertical direction. However, the light emitting direction of each LED can be altered as necessary. Namely, each LED can be mounted to the LED board in a suitable position. Specifically, each LED can be mounted to the LED board so as to emit light downward in the vertical direction, or such that the light emitting direction (the light axis) aligned with the horizontal direction. The LEDs with different light emitting directions may be included.

(15) In the above embodiments, the LEDs and the light guide plates (unit light emitters) are two-dimensionally arranged parallel to each other inside the chassis. However, they may be one-dimensionally arranged parallel to each other. Specifically, the LEDs and the light guide plates are arranged parallel to each other in only in the vertical direction, or they are arranged parallel to each other only in the horizontal direction.

(16) In the above embodiments, a small gap is provided between the light-emitting surface 16a of each LED 16 and the corresponding light entrance surface 34. However, the light-emitting surface 16a and the light entrance surface 34 may be in contact with each other without the gap, that is, zero clearance. With this configuration, efficiency in passing light through the light entrance surface 34 improves.

(17) In the above embodiment, each LED 16 includes three different LED chips 16c configured to emit respective colors of RGB. However, LEDs each including a single LED chip configured to emit a single color of blue or violet and each configured to emit white light using fluorescent material may be used.

(18) In the above embodiment, each LED 16 includes three different LED chips 16c configured to emit respective colors of RGB. However, LEDs each including three different LED chips configured to emit respective colors of cyan (C), magenta (M) and yellow (Y) or white LEDs may be used.

(19) In the above embodiment, the LEDs are used as point light sources. However, point light sources other than LEDs can be used.

(20) In the above embodiment, the LEDs are used as point light sources. However, linear light sources such as cold cathode tubes and hot cathode tubes other than the point light sources may be used.

(21) Planar light sources such as organic ELs may be used other than the embodiments and the above embodiments (19) and (20).

(22) The optical member may be configured differently from the above embodiments. Specifically, the number of diffusers or the number and the kind of the optical sheets can be altered as necessary. Furthermore, a plurality of optical sheets in the same kind may be used.

(23) In the above embodiment, the liquid crystal panel and the chassis are held in the vertical position with the long-side direction thereof aligned with the vertical direction. However, the liquid crystal panel and the chassis may be held in the vertical position with the long-side direction thereof aligned with the vertical direction.

(24) In the above embodiment, TFTs are used as switching components of the liquid crystal display device. However, the technology described the above can be applied to liquid crystal display devices including switching components other than TFTs (e.g., thin film diode (TFD)). Moreover, the technology can be applied to not only color liquid crystal display devices but also black-and-white liquid crystal display devices.

(25) In the above embodiments, the liquid crystal display device including the liquid crystal panel 11 as a display component is used. The technology can be applied to display devices including other types of display components.

(26) In the above embodiments, the television receiver including the tuner is used. However, the technology can be applied to a display device without a tuner.

The invention claimed is:

1. A lighting device comprising:
   at least one light source;
   at least one light guide member having a light entrance surface and a light exit surface, the light entrance surface being arranged so as to face the light source via a gap, the light exit surface being arranged along an arrangement direction in which the light source and the light entrance surface are arranged, light from the light source entering the light entrance surface and exiting from the light exit surface;
   at least one reflection member arranged on an opposite surface of the light guide member from the light exit surface and configured to reflect light toward the light exit surface;
   at least one base member arranged so as to face the reflection member and to which the light source and the light guide member are mounted;
   at least one reflection part provided at least in an area of the base member between the light source and the light entrance surface and configured to reflect light toward the light entrance surface;
   the light source is a light-emitting diode including a housing having a drum shape with an opening on a light-emitting surface side and a receiving hole including an opening on the light entrance surface side;
   the base member is a circuit board on which the light-emitting diode is mounted;
   the light-emitting diode includes a light-emitting surface through which light is emitted and a mounting surface attached to the circuit board, the light-emitting surface and the mounting surface being arranged adjacent to each other;
   the reflection part has a thickness that measures from a mounting surface of the circuit board on which the light-emitting diode is mounted is substantially equal to or smaller than a thickness of an opening edge of the housing; and
   the reflection part includes an extending portion arranged in the receiving hole.

2. The lighting device according to claim 1, wherein the reflection part is made of insulating material.

3. The lighting device according to claim 2, wherein the reflection part includes a number of dielectrics having different refraction indexes.

4. The lighting device according to claim 1, wherein the reflection part has a thickness that measures from a mounting surface of the circuit board is smaller than the thickness of the opening edge.

5. The lighting device according to claim 1, wherein:
   the at least one light source and the at least one light guide member include a plurality of the light sources and a plurality of the line guide members, respectively; and
   the light sources and the light guide members are arranged in lines that are parallel to each other.

6. The lighting device according to claim 5, wherein:
   the light sources and the light guide members are arranged in lines that are parallel to each other such that the adjacent light guide members are partially overlap each other in a direction perpendicular to the light exit surfaces;
   the light guide members include a first light guide member and a second light guide member, the first light guide member being arranged closer to the base member than the second light guide member and the second light guide member being arranged farther from the base member relative to the first light guide member; and
   the reflection member is arranged on the second light guide member so as to cover a gap between the light entrance surface of the first light guide member and the light source.

7. The lighting device according to claim 6, wherein:
   the first light guide member has a light source holding space for holding the light source, the light source holding space running all the way through the first light guide member; and
   the reflection member is arranged on the second light guide member so as to cover the light source holding space.

8. The lighting device according to claim 5, wherein the light sources and the light guide members are two-dimensionally arranged in a parallel layout.

9. The lighting device according to claim 1, wherein:
   each light guide member and the corresponding reflection member are bonded together with at least one adhesive; and
   each light guide member has at least one adhesive recess that has an opening on a reflection member side and is filled with the adhesive.

10. The lighting device according to claim 9, wherein the adhesive is placed on the light guide member in a location close to an end of a dimension perpendicular to the arrangement direction and parallel to the light exit surface.

11. The lighting device according to claim 10, wherein the at least one adhesive includes a pair of the adhesives placed on the light guide member in locations close to respective ends of the dimension perpendicular to the arrangement direction and parallel to the light exit surface.

12. The lighting device according to claim 1, wherein the reflection part is provided integrally with the reflection member.

13. The lighting device according to claim 12, wherein the light guide member and the base member have positioning structures, respectively, the positioning structures being provided for positioning the light guide member relative to the base member with respect to the arrangement direction.

14. The lighting device according to claim 1, wherein the reflection part is provided separately from the reflection member.

15. The lighting device according to claim 14, wherein the reflection part is made of material having higher reflection efficiency than that of the reflection member.

16. The lighting device according to claim 14, wherein the reflection part is provided integrally with the base member.

17. The lighting device according to claim 14, wherein the light guide member and the base member have positioning structures for positioning the light guide member relative to the base member with respect to the arrangement direction.

18. A display device comprising:
   the lighting device according to claim 1; and
   a display panel configured to provide display using light from the lighting device.

19. The display device according to claim 18, wherein the display panel is a liquid crystal panel including liquid crystals sealed between a pair of substrates.

20. A television receiver comprising the display device according to claim 18.

* * * * *